(12) United States Patent  
Imao

(10) Patent No.: US 7,724,771 B2
(45) Date of Patent: May 25, 2010

(54) COMMUNICATION APPARATUS AND COMMUNICATION CONTROL METHOD

(75) Inventor: Eiji Imao, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 289 days.

(21) Appl. No.: 11/779,733

(22) Filed: Jul. 18, 2007

(65) Prior Publication Data
US 2008/0031267 A1 Feb. 7, 2008

(30) Foreign Application Priority Data
Aug. 4, 2006 (JP) .............................. 2006-213425

(51) Int. Cl.
*H04J 3/16* (2006.01)
(52) U.S. Cl. .................... 370/466; 370/464; 370/465
(58) Field of Classification Search ............... 370/419, 370/466, 392, 464, 465
See application file for complete search history.

(56) References Cited

U.S. PATENT DOCUMENTS

| | | | |
|---|---|---|---|
| 6,625,169 B1* | 9/2003 | Tofano | 370/466 |
| 6,941,386 B2* | 9/2005 | Craft et al. | 709/250 |
| 7,089,282 B2* | 8/2006 | Rajamony et al. | 709/203 |
| 7,231,452 B2* | 6/2007 | Ananda et al. | 709/230 |
| 7,274,706 B1* | 9/2007 | Nguyen et al. | 370/419 |
| 2002/0199019 A1* | 12/2002 | Battin et al. | 709/245 |
| 2004/0042483 A1* | 3/2004 | Elzur et al. | 370/463 |
| 2004/0215796 A1* | 10/2004 | Maeda et al. | 709/230 |
| 2004/0257986 A1* | 12/2004 | Jha et al. | 370/229 |
| 2005/0114535 A1* | 5/2005 | Il et al. | 709/230 |
| 2007/0016903 A1* | 1/2007 | Maeomichi et al. | 717/177 |
| 2007/0291661 A1* | 12/2007 | Nishibayashi et al. | 370/252 |

FOREIGN PATENT DOCUMENTS

WO 2004/021150 3/2004

* cited by examiner

*Primary Examiner*—Chi H Pham
*Assistant Examiner*—Robert Lopata
(74) *Attorney, Agent, or Firm*—Fitzpatrick, Cella, Harper & Scinto

(57) ABSTRACT

An application device includes a network communication unit and an application system unit. The application system unit executes application communication utilizing one of a first TCP/IP protocol processing performed by the network communication unit and a second TCP/IP protocol processing performed by the application system unit. The network communication unit switches the process with which the application communication is processed to one of the first TCP/IP protocol processing and the second TCP/IP protocol processing based on a communication condition of the application communication.

19 Claims, 21 Drawing Sheets

FIG. 9

| PROTOCOL | NETWORK COMMUNICATION UNIT (401) | APPLICATION SYSTEM UNIT (402) |
|---|---|---|
| TCP (CONNECTION ESTABLISHMENT / CLOSING PHASE) | | SECURING TCP SOCKET RESOURCES, CREATING TCB (TCP Control Block) SYN SENDING, SYN-ACK SENDING / RECEIVING |
| TCP (CONNECTION CURRENTLY ESTABLISHED) | TCP STREAM SEGMENTING CONGESTION CONTROL, RESENDING CONTROL STREAM RECONSTRUCTION (REORDERING) ACKNOWLEDGEMENT (ACK) PROCESSING | |
| TCP (REGARDLESS OF TCP CONNECTION STATE) | TCP HEADER ANALYSIS TCP CHECKSUM COMPUTATION / VERIFICATION TCP SOCKET WHEN RECEIVING TCP PACKET | MANAGEMENT OF Listen TABLE HELD WITHIN NETWORK COMMUNICATION UNIT |
| | TABLE SEARCH Listen TABLE SEARCH WHEN RECEIVING SYN | |
| UDP | UDP CHECKSUM COMPUTATION / VERIFICATION bind TABLE SEARCH WHEN RECEIVING UDP (UDP SOCKET SEARCH) | UDP SOCKET LAYER RECEIVING PROCESSING UDP PACKET CREATION / SENDING PROCESSING MANAGEMENT OF bind TABLE HELD WITHIN NETWORK COMMUNICATION UNIT |
| ICMP-Echo | SEND ICMP-Echo-Reply UPON RECEIVING ICMP-Echo-Request | SENDING Echo-Request FROM APPLICATION SYSTEM UNIT AND RECEIVING Echo-Reply FROM OTHER NODES |
| ICMP (ALL ICMP TYPES COMMON) | RECEIVED ICMP PACKET CHECKSUM COMPUTATION / VERIFICATION | ICMP PROCESSING (SENDING / RECEIVING) |
| OTHER IP UPPER PROTOCOL | | PROCESSING OF THE PROTOCOL (SENDING / RECEIVING) |
| IP VERSION 4 IP VERSION 6 | IP HEADER ANALYSIS, VERIFICATION IP CHECKSUM COMPUTATION / VERIFICATION (IPv4) | |

COMMUNICATION APPARATUS AND COMMUNICATION CONTROL METHOD

BACKGROUND OF THE INVENTION

1. Field of the Invention

The present invention relates to a communication apparatus and communication control method that provides application communication using TCP/IP protocol communication.

2. Description of the Related Art

In the present specification, "application device" refers to a device that is connected to a network and is capable of application communication in which TCP/IP protocol is the lower-layer protocol.

In general, TCP/IP protocol processing is often implemented through software called a TCP/IP protocol stack. FIG. 2 shows a hierarchy model of software processing in TCP/IP communication. In FIG. 2, the TCP/IP protocol stack is expressed by the software processing in a range indicated by the number 201. 202 in FIG. 2 is an application layer, and is application communication protocol processing that uses TCP/IP communication. Many protocols exist, including standard protocols such as Hyper Text Transfer Protocol (HTTP), protocols uniquely defined and implemented on an application-by-application basis, and so on.

203 is a socket layer, handling software interface processing through which the application layer process uses the lower-layer TCP/IP protocol. "Socket" refers to an end-point in TCP/IP communication, and can be identified by the IP address of the network device performing TCP/IP communication and the port numbers allocated in each instance of TCP/IP communication in the device. The socket interface is an interface for application software to handle TCP/IP communication, and is supported in many operating systems (OS).

204 is a transport layer protocol processing, and 205 is a network layer protocol processing. In TCP/IP, TCP and UDP (User Datagram Protocol) exist as protocols in the transport layer, and IPv4 (IP version 4) and IPv6 (IP version 6) exist as protocols in the network layer. 206 is a link layer, and is a communication protocol processing dependent on the physical medium of the network. 207, which is the lowest layer, is driver software for controlling the physical medium access control (MAC) device of the network.

Conventionally, TCP/IP communication has been realized in an application device by implementing the TCP/IP protocol processing by software executed by a central processing unit (CPU) included within the application device. Even now, in devices such as personal computers that are rich in processing resources, TCP/IP communication is realized by TCP/IP protocol processing incorporated within the OS.

However, in recent years, the amount of data sent and received by application devices has increased, and the processing load placed on the CPU by software processes for TCP/IP communication has become extremely large. For example, video server devices such as network cameras and network video distribution servers, digital audio/video (AV) devices such as network media players and network-compatible hard disk recorders, and the like have come into wide use. Moreover, in devices such as these that input and output video through a network, the processing load involved in communication processing for sending and receiving high-resolution image data in real time is growing.

As a response to this increase in the CPU processing load for TCP/IP communication, a method of offloading TCP/IP protocol processing is being implemented, with the aim of reducing the load on the CPU of the application device and increasing TCP/IP communication throughput. In TCP/IP communication, "offloading" refers to processing mainly the software indicated by the number 208 in FIG. 2 with a separate processing device rather than with the CPU of the application device. For example, there are cases where offloaded processing is performed by a microprocessor different from the CPU of the application device, and cases where parts in which the computational amount of TCP/IP processing in the software is large are processed at high speed by a dedicated hardware circuit.

U.S. Pat. No. 6,941,386 discloses a method related to an intelligent network interface card (INIC) that is installed in a communication processing device included in a host device or an external expansion interface of the host device. With this method, TCP/IP protocol processing through hardware circuit processing is realized, and the software processing of the TCP/IP protocol stack performed by the CPU of the host device is offloaded.

In this conventional example, the scheme is such that a generic protocol stack executed by the CPU is retained and the TCP/IP protocol processing realized by software is executed by the CPU. In other words, two types of processing are provided: slow-path processing performed by the generic protocol stack, and fast-path processing performed by hardware processing. This is because TCP/IP protocol processing is of a scope that cannot be supported by hardware processing or the cost of implementation as hardware cannot be justified.

In addition, in recent years, there are cases where TCP/IP protocol processing performed by the CPU of the application device is completely offloaded by dedicated hardware, thereby reducing CPU resource usage for TCP/IP communication to a minimum.

However, in the case of an integrated device in which strict limitations are placed on the cost of hardware resources, a scheme that offloads TCP/IP protocol processing with hardware limits the number of communication connections that can be processed to a small number. Thus, there is a problem that the application device cannot open many communication connections and execute communication simultaneously.

Furthermore, offloading all of the protocol processing in the range indicated by the number 208 in FIG. 2, which has conventionally been processed by software, with completely dedicated hardware results in the scale of the hardware circuit becoming large. Therefore, in terms of cost, such a scheme is inappropriate in an integrated device in which strict limitations are placed on the hardware resources.

SUMMARY OF THE INVENTION

The present invention provides a technique for improving TCP/IP communication performance in a communication apparatus.

In addition, the present invention provides a technique for realizing high throughput, and a technique for implementing processing through hardware while maintaining an appropriate cost, in TCP/IP communication.

According to one aspect of the present invention, there is provided a communication apparatus that performs application communication utilizing TCP/IP protocol, the communication apparatus comprising a network communication unit and an application system unit, wherein the application system unit executes application communication utilizing one of a first TCP/IP protocol processing performed by the network communication unit and a second TCP/IP protocol processing performed by the application system unit, and the network communication unit switches the process with which the application communication is processed to one of the first TCP/IP protocol processing and the second TCP/IP protocol processing based on a communication condition of the application communication.

According to another aspect of the present invention, there is provided a communication control method for a communication apparatus that performs application communication utilizing TCP/IP protocol, the communication apparatus comprising a network communication unit and an application system unit, the method comprising the steps of executing application communication utilizing one of a first TCP/IP protocol processing performed by the network communication unit and a second TCP/IP protocol processing performed by the application system unit, and switching the process with which the application communication is processed to one of the first TCP/IP protocol processing and the second TCP/IP protocol processing based on a communication condition of the application communication.

According to still another aspect of the present invention, there is provided a storage medium on which is stored a computer program for controlling a communication apparatus that performs application communication utilizing TCP/IP protocol, the communication apparatus comprising a network communication unit and an application system unit, the computer program comprising a process of executing application communication utilizing one of a first TCP/IP protocol processing performed by the network communication unit and a second TCP/IP protocol processing performed by the application system unit, and a process of switching the process with which the application communication is processed to one of the first TCP/IP protocol processing and the second TCP/IP protocol processing based on a communication condition of the application communication.

Further features of the present invention will become apparent from the following description of exemplary embodiments with reference to the attached drawings.

BRIEF DESCRIPTION OF THE DRAWINGS

FIG. 9 is a diagram showing processing units that execute protocol processing and the main processing details of the processing units, per TCP/IP protocol.

DESCRIPTION OF THE EMBODIMENTS

First Embodiment

Figure 1:
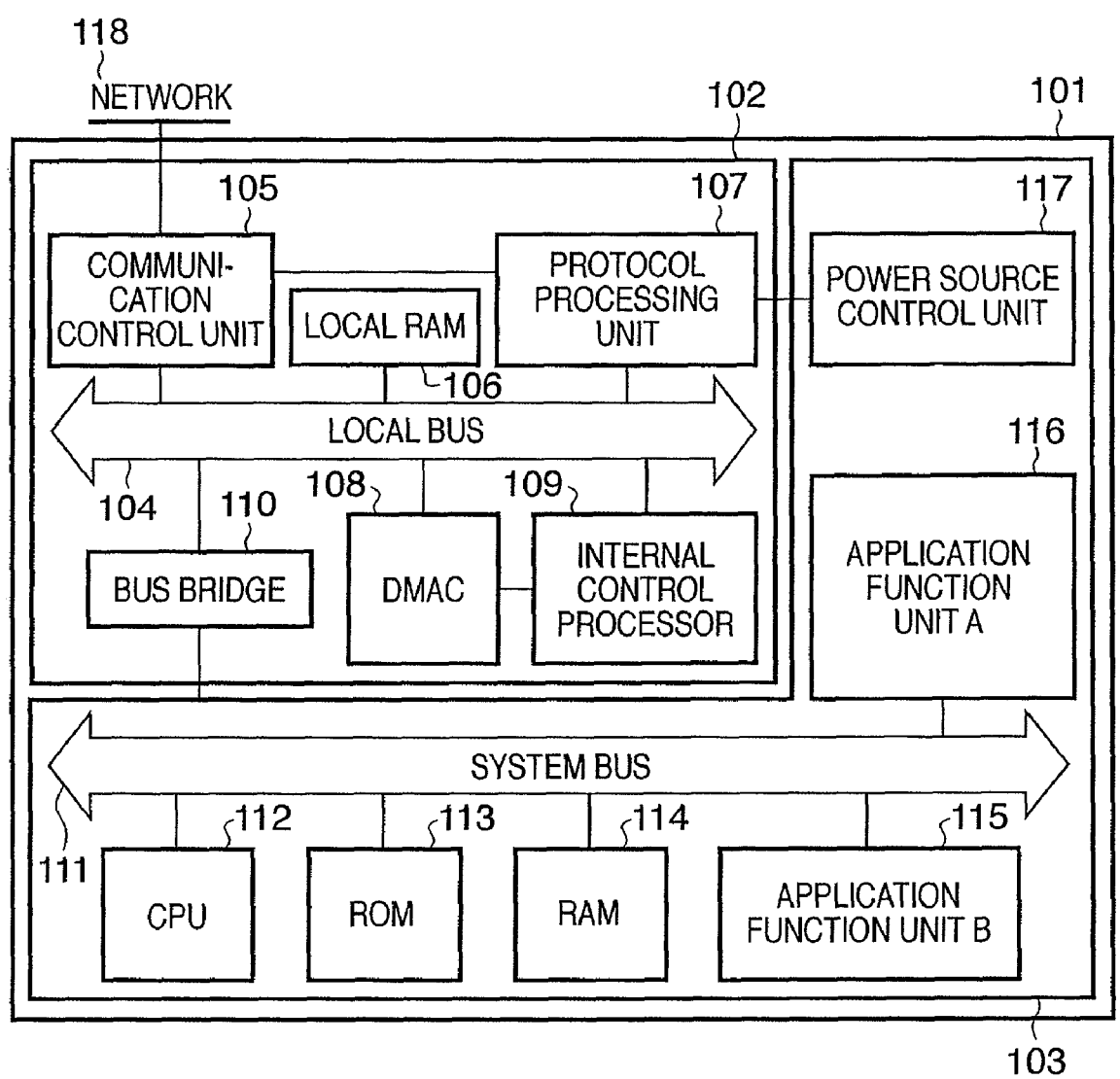
FIG. 1 is a block diagram showing an example of an embodiment of the present invention.
Figure 2:
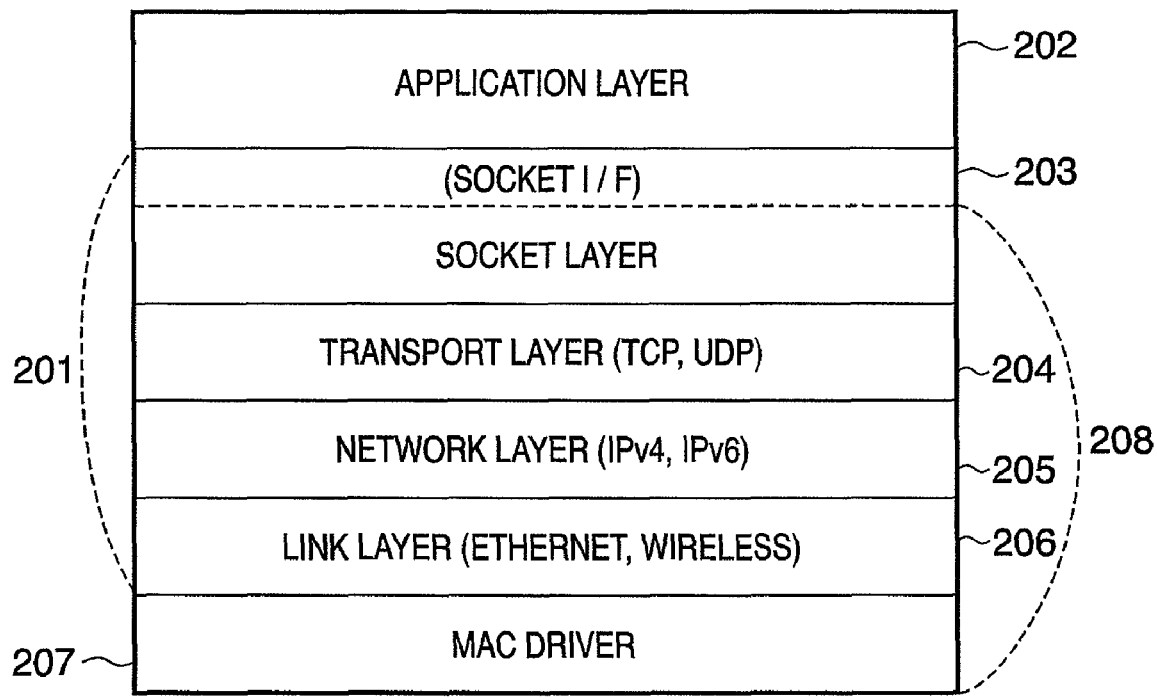
FIG. 2 is a diagram showing a hierarchy model of software processing in TCP/IP communication.

FIG. 1 is a block diagram showing an example of an embodiment of an application device as a communication apparatus according to the present invention. In FIG. 1, 101 indicates the application device of the present embodiment. This application device, which is a communication apparatus, includes a network communication unit 102 and an application system unit 103, and performs application communication using TCP/IP protocol. 102 is the network communication unit, and 103 is the application system unit. A communication control unit 105 that is connected to a network 118 and sends/receives frames, and a local RAM 106 that is a main storage device within the network communication unit 102, are connected to a local bus 104 of the network communication unit 102. In addition, a protocol processing unit 107 that executes TCP/IP protocol processing, a DMA controller (DMAC) 108 for executing bus transfer of data, and an internal control processor (local CPU) 109 that executes a control program within the network communication unit 102, are connected to the local bus 104.

A CPU 112, and a ROM 113 in which a system program is stored, are connected to a system bus 111 of the application system unit 103. In addition, a RAM 114 that is a main storage device used during execution of the system program is connected to the system bus 111; the system program is loaded from the ROM 113 to the RAM 114 and executed by the CPU 112. Furthermore, 115 and 116, connected to the same system bus 111, indicate hardware processing devices used to implement characteristic application functions of the application device. These are indicated by the names "application function unit A" (116) and "application function unit B" (115). Also in FIG. 1, 117 is a power source control unit that controls the power supply to the network communication unit 102 and the application system unit 103.

In the application device 101, the communication control unit 105 is physically connected to the network 118. The network 118 is a hard-wired network exemplified by Ethernet®; however, the network 118 may be a wireless network, a fiber-optic network, or the like. Furthermore, the network 118 may be connected to another network or the Internet so that a user of the application device 101 can perform application communication through TCP/IP communication from a remote location.

The communication control unit 105 within the network communication unit 102 has a function of sending/receiving transmission frames to/from the network 118. For example, in the case of Ethernet®, the communication control unit 105 includes functionality for Ethernet® MAC processing (sending media control processing), sending/receiving frame data, and the like.

The protocol processing unit 107 is a processing device dedicated to communication protocol processing, and has functionality for performing generic TCP/IP protocol processing. Specifically, the protocol processing unit 107 has functions for performing IPv4, IPv6, ICMP, UDP, and TCP packet creation processing, send flow control and congestion control, communication error control, and so on. The protocol processing unit 107 can realize high-speed processing for a variety of processes by being implemented particularly as a hardware circuit (that is, an LSI). Calculating and verifying a checksum for each protocol packet and fragmenting and defragmenting IP packets can be given as examples of this kind of processing. Segmenting of sent data in TCP and defragmenting (reconstruction) from received packets can be given as further examples of this kind of processing. Furthermore, processing that requires time for computation in TCP/IP protocol software processing, such as resending of TCP packets, ACK (acknowledgment) processing in TCP communication, and the like can be given as further examples of this kind of processing.

High throughput and low delay in application communication can be realized by the protocol processing unit 107 offloading the TCP/IP protocol processing of the CPU 112 that executes the application.

An internal control processor 109 executes a control program of the network communication unit 102. The control program controls the operation of each device and the data flow among devices within the network communication unit 102. The control program also receives control commands from the application system unit 103 and performs internal controls. The local RAM 106 is used as a temporary storage area for data in the processing performed by the communication control unit 105, the protocol processing unit 107, the internal control processor 109, and the like.

Moreover, a bus bridge circuit 110 is provided within the network communication unit 102, enabling data transfer between the local bus 104 and the system bus 111 of the application system unit 103. In other words, the respective bus circuits of the network communication unit 102 and the application system unit 103 are connected to one another, and communication data input/output is performed through bus transfer. The device that performs bus transfer of the data is the DMA controller 108. The DMA controller 108 is also used when transferring data among devices within the network communication unit 102.

Application functions of the application device 101 are implemented by the application system unit 103. The CPU 112 controls operations of the application function unit A (116) and application function unit B (115), executes application communication, which is part of the application function, and the like. Application communication is communication that utilizes the TCP/IP protocol. The RAM 114 is used as a temporary storage area during program execution performed by the CPU 112, and is also used as an input/output data buffer utilized by the network communication unit 102 and the application function units 115 and 116. The system program executed by the CPU 112 is capable of executing TCP/IP protocol processing. In other words, a generic TCP/IP communication function is executed by software in the application system unit 103. In addition, packets are sent/received via the communication control unit 105 within the network communication unit 102.

Figure 3:
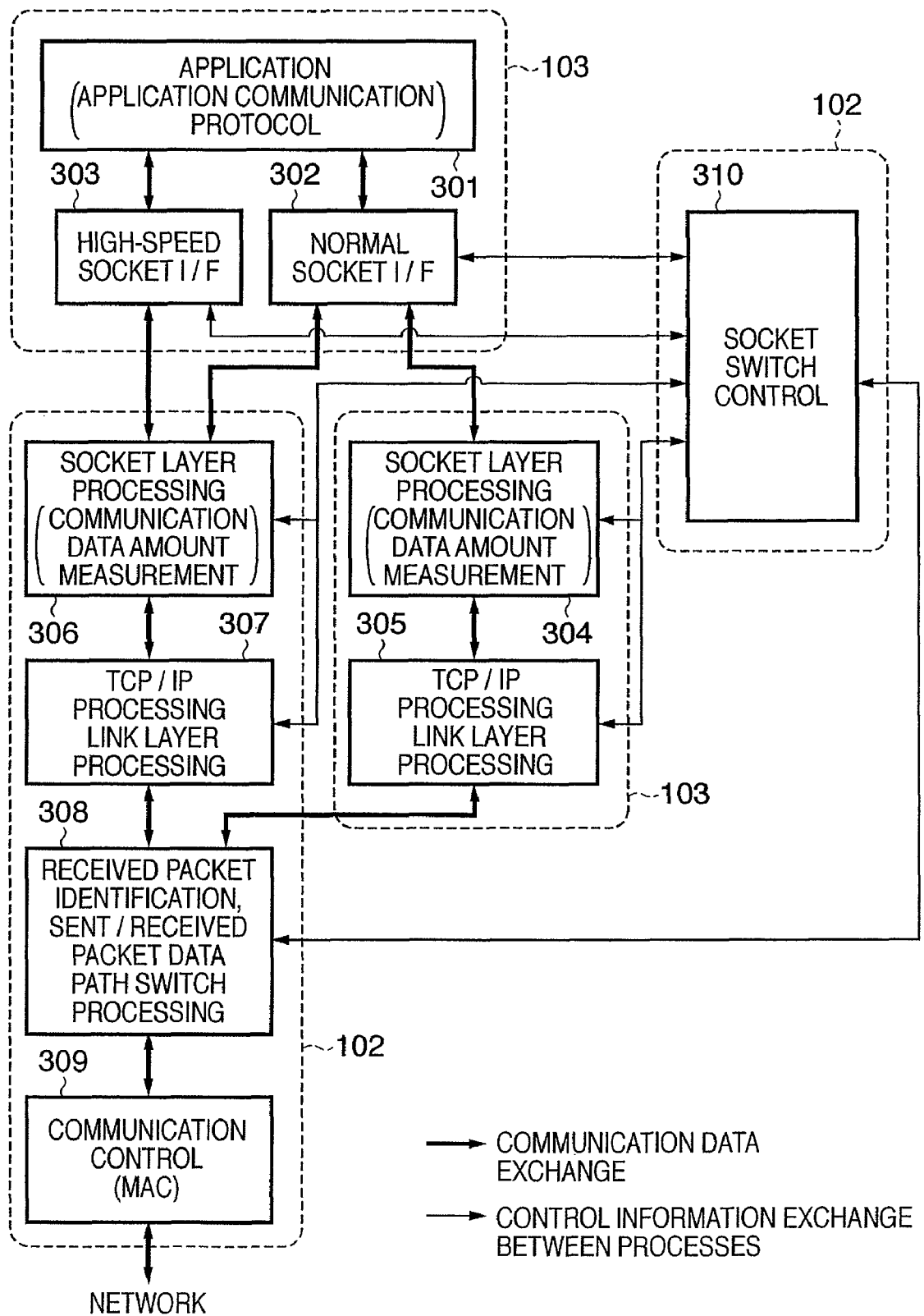
FIG. 3 is a diagram showing a processing flow of the TCP/IP communication portion of application communication.

How TCP/IP protocol processing and data sending/receiving processing in application communication are performed in the working embodiment of the application device 101 as described above shall be explained with reference to FIG. 3. FIG. 3 illustrates a processing flow of the TCP/IP communication portion of application communication. In FIG. 3, 301-309 each represent a process module.

301 is an application that performs application communication. For example, in the case of a File Transfer Protocol (FTP) server in which the application sends files, the application is the server program. FTP is an application protocol that utilizes the TCP/IP protocol. The application 301 is executed within the application system unit 103 (CPU 112). The application 301 performs application communication using either a normal socket interface 302 or a high-speed socket interface 303.

In the case where the normal socket interface 302 is utilized, TCP/IP protocol processing is executed by one of offloaded processing performed by the network communication unit 102 and software processing performed by the CPU 112 of the application system unit 103. In the present embodiment, by which of these processes the TCP/IP protocol processing is to be executed is dynamically switched per instance of application communication. The application 301 does not need to identify which TCP/IP protocol processing (in other words, the abovementioned offloaded processing or software processing) is executed.

However, in the case where the application 301 performs application communication utilizing the high-speed socket interface 303, TCP/IP communication that performs offload processing with the network communication unit 102 is used preferentially. Therefore, the high-speed socket interface 303 may be used in the case where the TCP/IP protocol processing of a specific application communication is to be consistently processed at high speed and communication is preferentially to be performed with high throughput and low delay.

Each of the abovementioned socket interfaces 302 and 303 are software processes executed by the application system unit 103.

In FIG. 3, 304 is socket layer processing, and 305 is TCP/IP protocol processing and link layer protocol processing (link layer processing). 304 and 305 are both software processes executed by the CPU 112 of the application system unit 103. In the case where the processing of 304 is to be executed via the normal socket interface 302, the TCP/IP protocol processing is executed by software. 304 performs communication socket processing of the application 301 using the normal socket interface 302. The amount of data sent/received is measured in each socket. In the measurement processing, the amount of data input/output to a sending/receiving buffer (within the RAM 114) is measured per set amount of time, for all instances of application communication.

Next, 305 is TCP/IP processing, in which TCP or UDP protocol processing and IP protocol processing are performed, TCP and UDP being transport layer protocols and IP being a network layer protocol. In addition, in communication that uses TCP as the transport layer protocol, the TCP connection state is monitored. The TCP connection state refers to the state of progress of TCP communications, as denoted in RFC-793. The TCP/IP processing in 305 counts the number of times a packet is sent or received in each instance of application communication per set amount of time. Furthermore, 305 is link layer protocol processing (link layer processing), in which frames are sent/received in a wired LAN (for example, IEEE 802.3) protocol, a wireless LAN (for example, IEEE 802.11a/b/g) protocol, or the like.

In FIG. 3, 306-309 indicate processes performed by the network communication unit 102, where 306-308 are processes performed by the protocol processing unit 107. The processing of 306 being executed via the normal socket interface 302 corresponds to the case where the TCP/IP protocol processing of application communication is switched so as to be executed by the network communication unit 102.

306 is socket layer processing, and has the same function as 304 mentioned above; however, while the socket layer process in 304 is a software process executed by the CPU 112, 306 is a hardware circuit process performed by the protocol processing unit 107, and is capable of high-speed processing. Similarly, 307 is link layer protocol processing, has the same function as 305 mentioned above, and is processing performed by the protocol processing unit 107.

308 is processing for analyzing (identifying) a received packet and switching the data path of sent/received packets. When a packet is sent, a transmission frame is created in the RAM 114 at 305, and a transmission frame is created in the local RAM 106 at 307. Therefore, 308 changes the point from where the frame is read out depending on whether the sending is from 305 or 307, and transfers the data to the communication control unit 105.

On the other hand, when a packet is received, the data structure of the frame received from the communication control unit 105 is analyzed. The protocol header structure of the link layer, network layer, and transport layer of the received frame are read out, and the protocol type of each layer, the IP address of the origin, and the port numbers of the origin/destination are acquired. Then, it is determined, based on the acquired information, whether the frame data is to be received by 305 or 307. Along with this determination, the packet is transferred to one of the RAM 114, which has a buffer for 305 to process the received frame data, and the local RAM 106, which has a buffer for 307 to process the received frame data.

309 is communication control processing of the communication control unit 105, and executes control of data sending/receiving to/from the network 118.

In FIG. 3, 310 is socket switch control, and is processing that manages the processing resources of TCP/IP communication throughout the entire application device system. 310 manages the allocation of the number of instances of communication that can be processed by the network communication unit 102. 310 also determines which of the socket layer processes 304 and 306 is to be performed from the normal socket interface 302 and performs the switch thereof dynamically, per instance of application communication. It should be noted that in the present embodiment, 310 is described as being executed by the internal control processor 109 that is within the network communication unit 102. However, 310 may be executed through hardware processing by the protocol processing unit 107.

310 takes information necessary for determination of the socket layer process switch from 304, 305, 306, and 307. As mentioned above, the socket layer processes of 304 and 306 measure the amount of data input/output to/from the sending/receiving buffer per set amount of time, for each instance of communication. In addition, in the TCP/IP processing of 305 and 307, the number of sent/received packets is counted per set amount of time, for each instance of TCP/IP communication. Furthermore, the state of the TCP connection is monitored in the case of communication using TCP. The information of these results is sent to the socket switch control 310. The socket switch control 310 receives this information, determines a switch based on which of the socket layer processes of 304 and 306 is to be executed in the application communication, and performs the switch.

Figure 4:
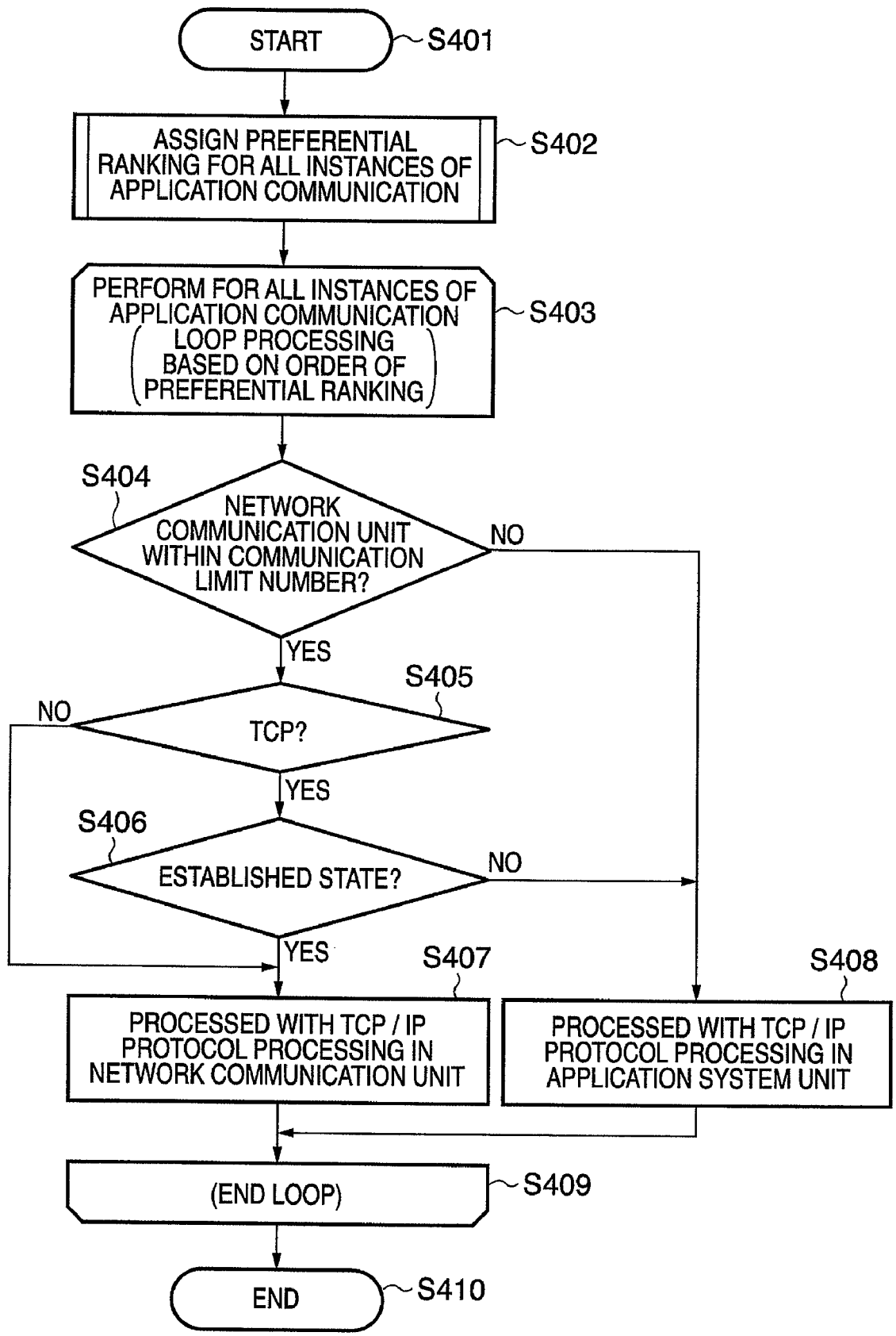
FIG. 4 is a flowchart illustrating a procedure for determining whether to execute TCP/IP protocol processing in a network communication unit or an application system unit.
Figure 5:
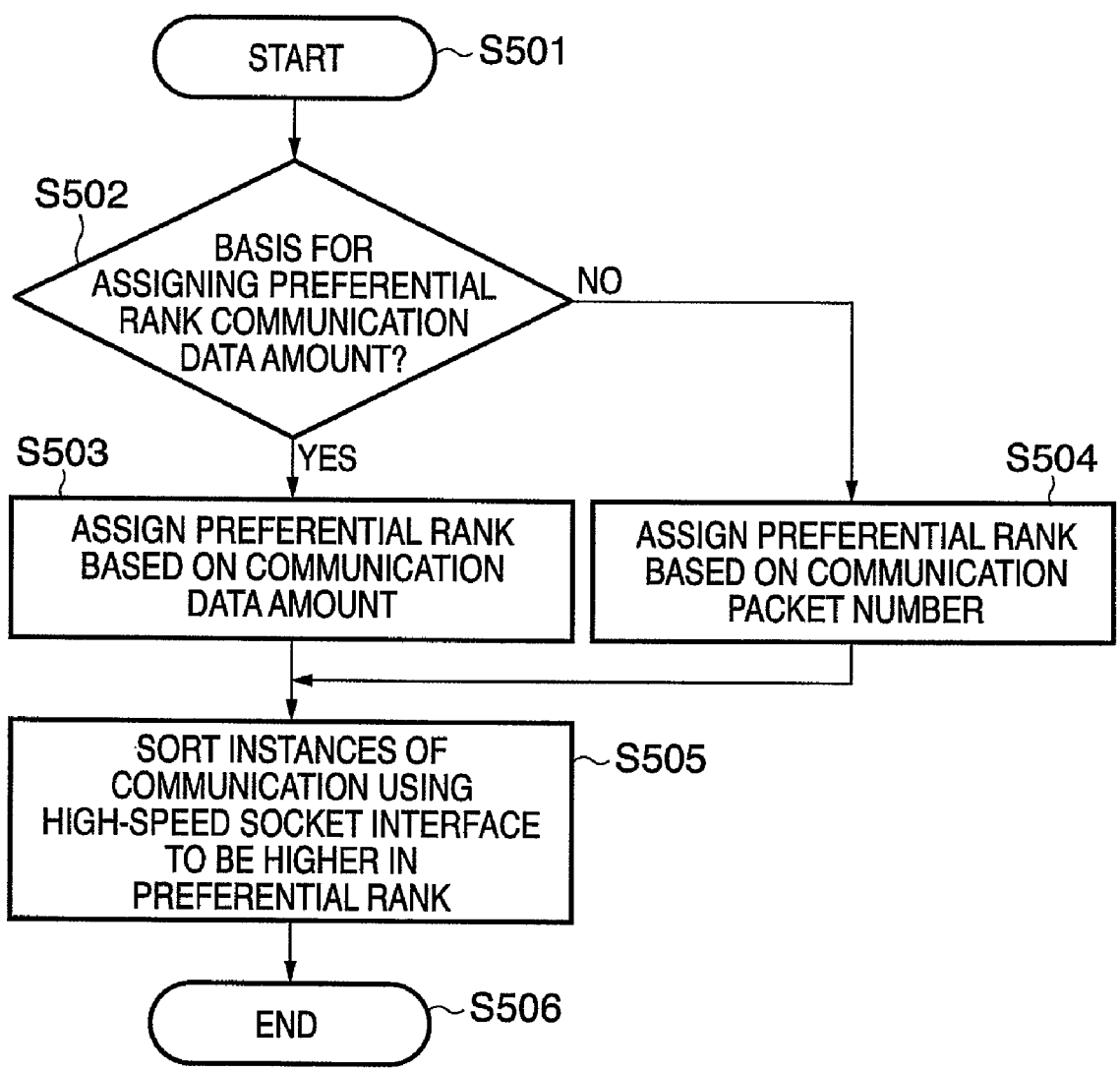
FIG. 5 is a flowchart illustrating a procedure of step S402 of FIG. 4.

Next, a procedure of the abovementioned switch determination of the socket switch control 310 shall be explained with reference to FIGS. 4 and 5. FIG. 4 is a flowchart illustrating a procedure for determining whether to execute TCP/IP protocol processing of application communication in the network communication unit 102 or in the application system unit 103. FIG. 5 is a diagram showing the details of S402 of FIG. 4 in a separate chart.

The switch determination starts at S401. In S402, the network communication unit 102 determines the preferential rank at which TCP/IP protocol processing is to be performed, in all instances of application communication.

S403 to S409 are steps repeated for all instances of application communication, in which it is determined whether the TCP/IP protocol processing for each instance of application communication is to be executed by the network communication unit 102 or by the application system unit 103.

Note that the steps are repeated in order based on the preferential rank determined in S402. In the first of the repeated steps, S404, it is determined whether the number of instances of communications processed by the network communication unit 102 is less than or equal to a limit number (a predetermined number); if so, the procedure moves to S405, and if not, the procedure moves to S408.

In S405, it is determined whether the instance of application communication currently handled in the repeated steps is communication using TCP. In the case of TCP communication, the state of the TCP connection is determined in S406.

When the state of the TCP connection is "ESTABLISHED", in S407, the application communication is determined to be handled through TCP/IP protocol processing by the network communication unit 102. TCP/IP protocol processing by the network communication unit 102 is, for example, processing performed by a dedicated hardware circuit (the communication control unit 105, the protocol processing unit 107, or the like) within the network communication unit 102. Furthermore, TCP/IP protocol processing by the network communication unit 102 is, for example, processing in which software processing performed by the internal control processor 109 within the network communication unit 102 and computational processing performed by a hardware circuit are combined, the hardware circuit being the communication control unit 105, the protocol processing unit 107, or the like.

In addition, in S406, in the case where the communication is not TCP (that is, mainly the case where the communication is UDP communication), the procedure moves to S408.

In S408, that instance of application communication is determined to be handled through TCP/IP protocol processing of the application system unit 103. TCP/IP protocol processing of the application system unit 103 is software processing executed by a processor (the CPU 112) within the application system unit 103.

Through the repeated steps S403 to S409, whether the TCP/IP protocol processing is to be executed by the network communication unit 102 or by the application system unit 103 is determined for all instances of application communication.

As described thus far, a means for preferentially offloading the TCP/IP protocol processing is used when the number of simultaneous instances of TCP/IP communication is within a limit number to which the number of times TCP/IP protocol processing can be offloaded is limited. Instances of TCP/IP communication that exceed the limit number are executed through software processing.

Note that in the present embodiment, whether to execute application communication processing through TCP/IP protocol processing performed by the network communication unit 102 or TCP/IP protocol processing performed by the application system unit 103 is switched depending on the state of the application communication. For example, TCP/IP protocol processing by the application system unit 103 is executed in a TCP state in negotiation leading to the establishment of a TCP connection, a TCP state in end stage of a TCP connection, and so on.

Next, the steps in S402 shall be explained with reference to FIG. 5.

As mentioned earlier, in S402, the network communication unit 102 determines the preferential rank at which TCP/IP protocol processing is to be performed, in all instances of application communication.

The procedure of FIG. 5 starts at S501. In S502, it is determined whether the basis for assigning the preferential rank is the amount of communication data or the number of communication packets. Which basis to use may be statically set in advance in the system of the application device, or may be changed during operations.

In the case where the amount of communication data is used as the standard in S502, the procedure moves to S503, whereas in the case where the number of communication packets is used as the standard, the procedure moves to S504.

In S503, the preferential rank is assigned so that communication having a high amount of data is higher in the preferential rank, based on the result of measuring the amount of data inputted/outputted to/from the socket buffer in the respective socket layer processes 304 and 306. On the other hand, in S504, the preferential rank is assigned to that communication having a large amount of packets is higher in the preferential rank, based on the result of counting the number of packets sent/received in the respective TCP/IP processings 305 and 307.

Next, in S505, the preferential rank created in S503 or S504 is sorted so that application communication that utilizes the high-speed socket interface 303 is higher in the preferential rank. The procedure for determining the preferential rank then ends in S506.

The steps in S402 are performed through such a procedure.

In accordance with the result of the switch determined as described above, the socket switch control 310 processes the application communication for which the determination is made through the socket layer process module of 306 in the case where the TCP/IP protocol processing of application communication is executed by the network communication unit 102. However, in the case where the TCP/IP protocol processing of application communication is executed by the application system unit 103, the socket switch control 310 processes the application communication for which the determination is made through the socket layer process module 304. The socket switch control 310 is executed periodically per set amount of time. However, it should be noted that in the present embodiment, the socket switch control 310 is also executed in accordance with the state of the application communication at, for example, a timing in which there has been an increase/decrease in application communication greater than a set number.

In this manner, the TCP/IP protocol processing of application communication is automatically switched between offloaded processing performed by the network communication unit 102 and software processing performed by the CPU 112 within the application system unit 103.

Descriptions of the first embodiment of the present invention have been given thus far. In the present embodiment, when the number of simultaneous instances of communication is greater than the number of offloadable instances of communication, the TCP/IP protocol processing is executed through software processing. Thus, many communication connections can be opened and communication executed simultaneously. Furthermore, the application device 101 is switched so that application communication requiring high-performance TCP/IP communication is preferentially offloaded and processed by the network communication unit 102; therefore, the communication performance of the device as a whole can be improved.

Second Embodiment

A network camera is an application device connected to a local LAN that distributes captured images via a network. Hereinafter, the case where a network camera is used as the application device shall be described, as an exemplary embodiment of the present invention.

The network camera of the present embodiment has a function to distribute captured still image data or captured moving image data in real time, a function for a user who is in a different location than the network camera to perform remote imaging operations such as starting and stopping imaging, adjusting pan/tilt/zoom, and so on. The network camera also includes a secondary storage device for storing captured still images, moving images, and the like, and has a function for transferring still image data, moving image data, and the like previously captured. The network camera further includes a web server, and has functionality in which images captured by the network camera can be displayed and imaging settings can be made by an administrator from a web browser of a PC, mobile phone, or the like. Various functions such as these are all utilized remotely by communication through a network.

Figure 6:
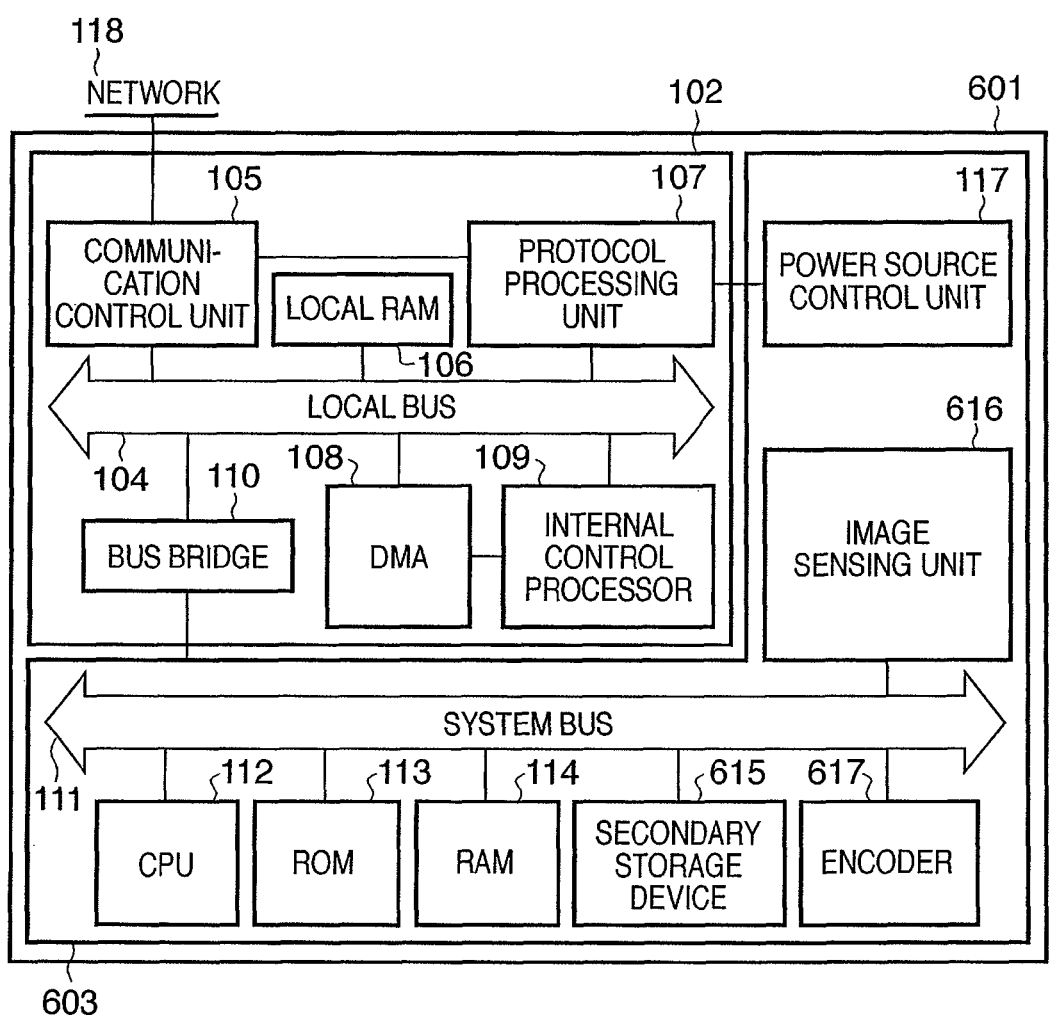
FIG. 6 is a block diagram of a network camera as an example of an application device.

FIG. 6 is a block diagram showing an example of the present invention embodied as a network camera. The system configuration of the network camera of the present embodiment is based on that of the application device described in the first embodiment. Hence, FIG. 6 is a block diagram that is based on FIG. 1. Constituent elements identical in both FIG. 6 and FIG. 1 are given identical reference numbers.

In FIG. 6, 601 is the network camera of the present embodiment. 603 is a camera system unit, which corresponds to the application system unit 103. The camera system unit 603 executes a number of instances of application communication using a network communication unit 102.

615 is a secondary storage device, and is, for example, a hard disk device, or a high-capacity non-volatile memory device such as a CF card, an SD card, or the like. The secondary storage device 615 is connected to a system bus 111, and is used mainly for saving files of still image and moving image data captured by the network camera 601. 616 is an image sensing unit of the network camera 601, and includes a lens, CCD (photoelectric conversion element), a CCD control unit, and the like. In the image sensing unit 616, an image projected through the lens is converted into an analog electrical signal by the CCD. Furthermore, the image sensing unit 616 includes an image processing unit that eliminates noise from the captured image that has been converted into an analog electrical signal and performs A/D conversion that converts the signal into digital data.

617 is an encoder, and encodes (encodes and compresses) the uncompressed digital image data. The image sensing unit 616 and the encoder 617 are connected to the system bus 111, and still image data, a moving image data stream, and the like are generated by the image sensing unit 616 outputting uncompressed digital image data at a set time cycle and the encoder 617 encoding that image data. The encoder 617 of the present embodiment is a hardware device that realizes high-speed encoding of image data, and is compliant with a number of encoding formats, such as JPEG, MPEG-4, and so on. A power source control unit 117 performs control that supplies power to and resets the devices 111 to 114 and 615 to 617 within the camera system unit 603 and commences termination processing for turning the power off without losing the data stored in the camera system unit 603 as a whole.

A CPU 112 executes control of the various devices within the camera system unit 603, execution of a camera application, and the like. A RAM 114 is a main storage device used for program execution performed by the CPU 112, and is used as an area for input/output of data used by the network communication unit 102, the image sensing unit 616 of the camera system unit 603, and the encoder 617. The camera functionality of the network camera 601 is realized by the camera system unit 603.

In addition, the system program executed by the CPU 112 executes application communication, which is a part of the functionality of the application. For example, in the case of streaming distribution of captured images, uncompressed image frame data captured by the image sensing unit 616 is encoded by the encoder 617, and the resulting compressed image data is outputted to the RAM 114. The system program executed by the CPU 112 creates streaming data in a format capable of being sent through a streaming protocol from the compressed image data in the RAM 114, and sends the streaming data using TCP/IP communication. In the sending of the streaming data, the TCP/IP communication processing is performed individually for more than one recipient.

Figure 7:
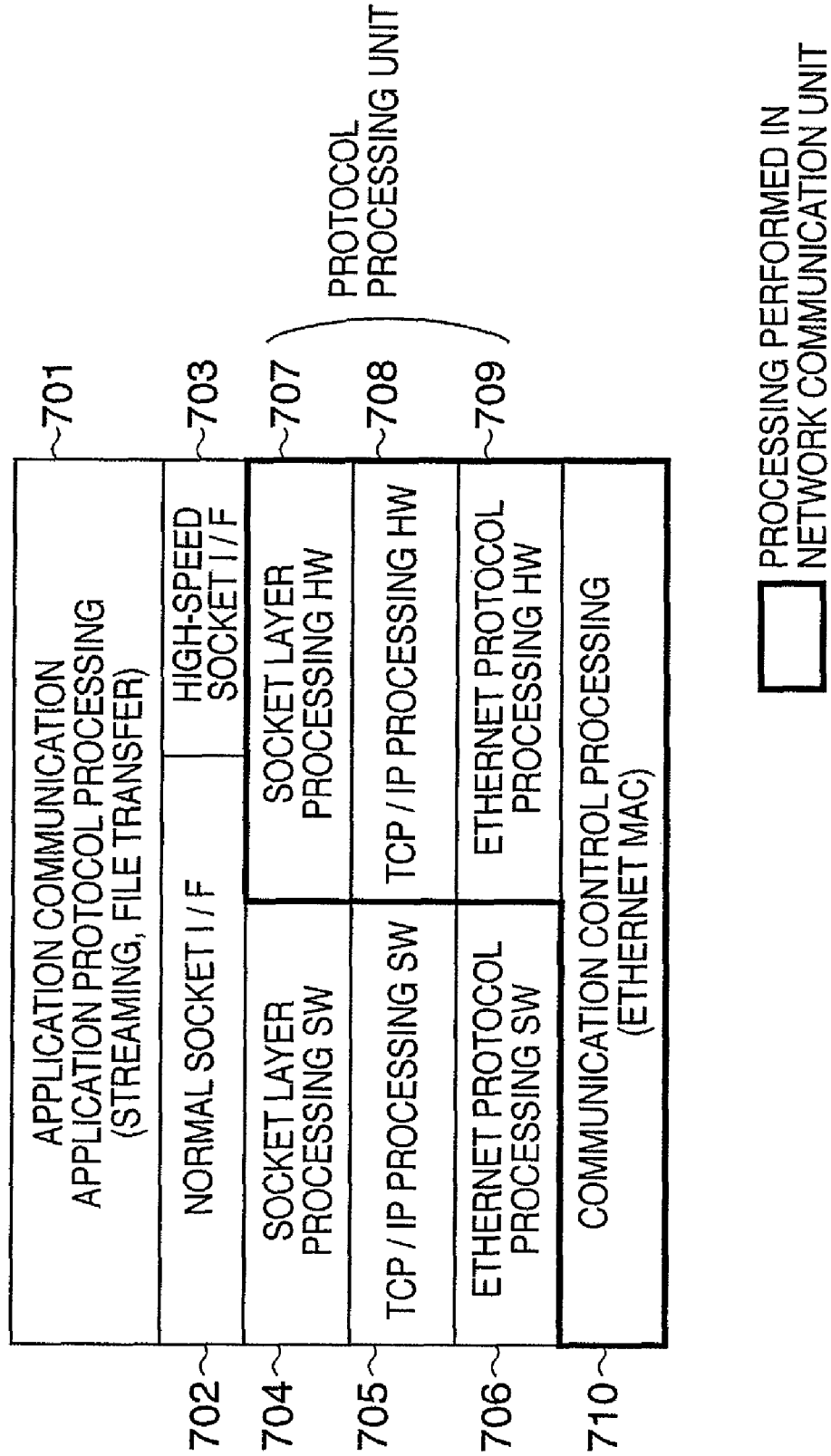
FIG. 7 is a diagram showing a hierarchy model of application communication processing of a network camera.

FIG. 7 is a diagram showing a hierarchy model of application communication processing in the present embodiment. In FIG. 7, processes of a higher layer depend on or utilize the processes of the layer below.

The highest layer is an application protocol communication processing 701 of application communication performed by the system program of the network camera 601. The application protocol communication processing 701 depends on lower communication processing via a normal socket interface 702 or a high-speed socket interface 703. 702 and 703 are application program interfaces (APIs) of the system program executed by the CPU 112, and are, to be more specific, program interfaces compatible with a general communications socket interface. The lower-layer processes used by the normal socket interface 702 and the high-speed socket interface 703 are different.

In FIG. 7, 704 to 706 are software processes implemented as part of the system program executed by the CPU 112. 704 is communication socket layer processing. 705 is software that performs TCP/IP processing, and executes TCP/IP protocol processing such as TCP, UDP, and IP. 706 is Ethernet® protocol processing, and is a software process that creates and sends/receives transmission frames for a network in which the physical media of the network is compliant with the IEEE 802.3 standard.

In FIG. 7, 707 to 709 are processes identical to 704 to 706. In other words, 707 is communication socket layer processing, 708 is TCP/IP protocol processing, and 709 is Ethernet® protocol processing. The communication processes 707 to 709 are functions of the protocol processing unit 107, and are processed at high speed by a hardware circuit. 710 is Ethernet® communication control processing, and is executed by the aforementioned communication control unit 105.

In FIG. 7, application communication using the normal socket interface 702 is executed by one of the lower-layer TCP/IP communication processing 704 to 706 and the TCP/IP communication processing 707 to 709, on which the normal socket interface 702 is dependent. In the case of the high-speed socket interface 703, the lower-layer TCP/IP communication processing is the processing 707 to 709, executed by the protocol processing unit 107.

In the network camera 601 of the present embodiment, two types of protocol processing of the TCP/IP communication used in application communication exist: processing by software executed by the CPU 112, and processing performed by hardware of the protocol processing unit 107. The difference between the two is particularly the processing speed. TCP/IP protocol processing performed by the protocol processing unit 107 realizes high-throughput, low-delay TCP/IP communication. In the present embodiment, application processing using the normal socket interface 702 automatically switches between the two types of TCP/IP communication processing. The switch scheme and switching itself are similar as those described in the first embodiment.

The network camera 601 requires high-bandwidth and low-delay TCP/IP communication in real time streaming distribution of captured images. In the present embodiment, such communication is switched so as to be preferentially offloaded and processed by the network communication unit 102, and therefore it is possible to improve the image distribution performance of the network camera.

Third Embodiment

Figure 8:
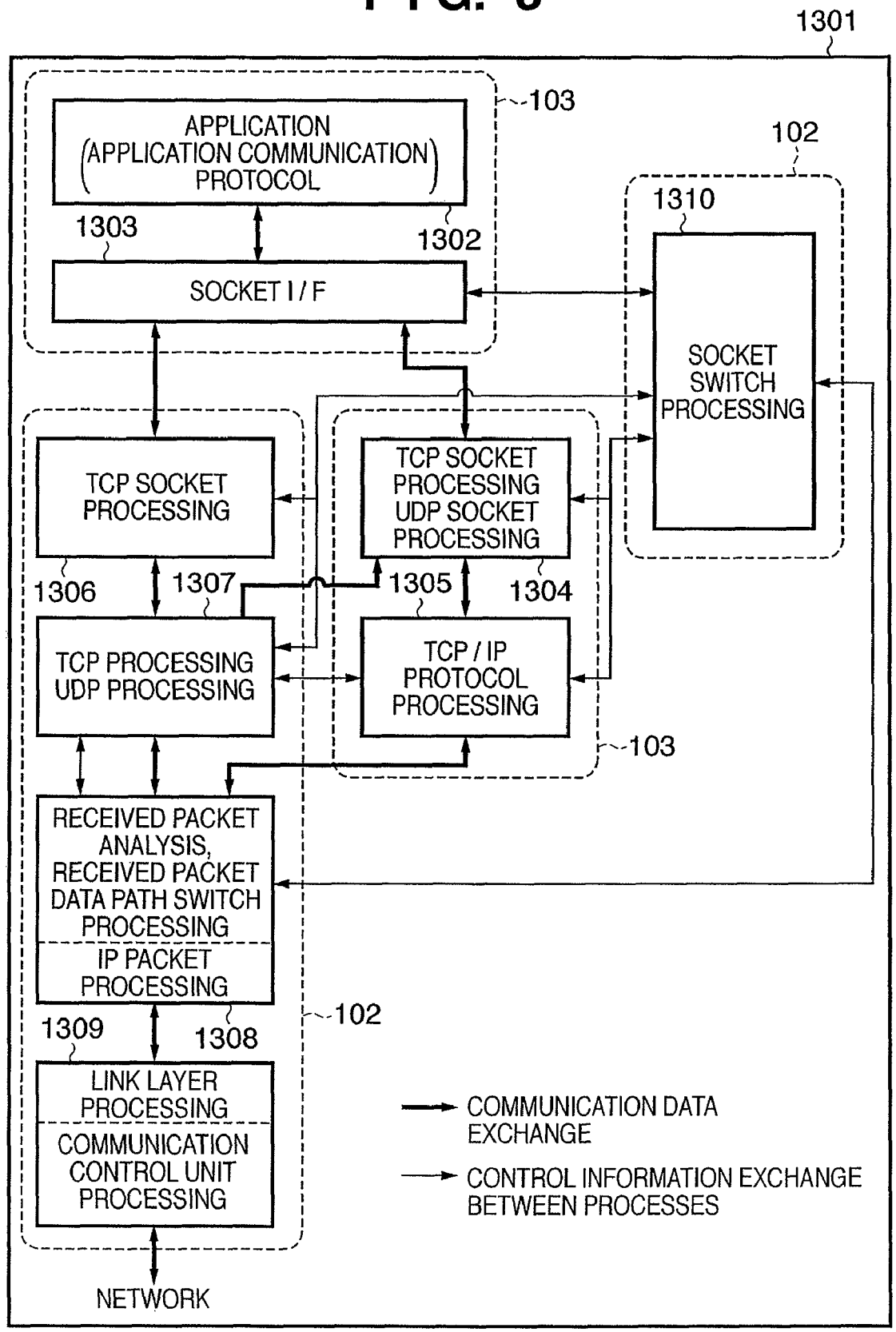
FIG. 8 is a diagram showing a flow of communication data among TCP/IP communication process modules in an embodiment of the present invention.

Next, the third embodiment of the present invention shall be described. The configuration of an application device 101 of the present embodiment is the same as shown FIG. 1. In the present embodiment, how TCP/IP protocol processing and data sending/receiving processing in application communication are performed shall be explained. FIG. 8 illustrates a data flow of TCP/IP communication processing in application communication.

In FIG. 8, 1301 expresses the whole of TCP/IP communication processing of the application device 101, and includes process modules 1302 to 1309. Note that in 1302 to 1309 of FIG. 8, process modules enclosed by a dotted line as processes performed by the application system unit 103 are software process modules, and are executed by the CPU 112. However, process modules enclosed in a dotted line as processes performed by the network communication unit 102 are hardware processes or both software and hardware processes. In other words, these process modules are processes executed by the protocol processing unit 107, the DMA controller 108, and the internal control processor 109.

In FIG. 8, 1302 is an application that performs application communication. For example, in the case of a File Transfer Protocol (FTP) server in which the application sends files, the application is the server program. FTP is an application layer protocol that utilizes the TCP/IP protocol. The application 1302 is executed within the application system unit 103. The application 1302 performs application communication using a socket interface 1303.

The socket interface 1303 is an interface for the software that executes application communication to perform data sending/receiving, and is a software process module executed by the application system unit 103. It is also called a socket API. In communication utilizing the socket interface 1303, TCP/IP protocol processing is executed by one of offloaded processing performed by the network communication unit 102 and software processing performed by the CPU 112 of the application system unit 103.

The chart 401 in FIG. 9 is a chart showing the processing unit that executes a protocol process and the main processing details thereof, per TCP/IP protocol, according to the present embodiment. As can be seen in this chart, TCP/IP communication processing of the application device 101 is executed by both the network communication unit 102 and the application system unit 103, depending on the protocol. In the present embodiment, which of these units is used to execute the processing is switched dynamically depending on the state of application communication. The application 1302 does not need to monitor which TCP/IP protocol processing is executed.

In FIG. 8, 1304 is a socket layer process module, and 1305 is a module that executes TCP/IP protocol processing. 1304 and 1305 are both software process modules executed by the CPU 112 of the application system unit 103.

When the processes of 1304 and 1305 are executed in application communication, the communication utilizes TCP, and the following applies: TCP protocol processing is switched so as to be executed by software in 1305; the communication utilizes UDP; and the communication utilizes a protocol other than TCP.

In TCP communication, the TCP protocol processing 1305 is executed when executing communication at the time of establishing a TCP connection and when executing communication at the time of closing a TCP connection, as is indicated by the area 402, enclosed by the dotted line in FIG. 9. In other words, in the present embodiment, communication processing during the establishment phase and ending phase of the TCP connection is executed by the CPU 112 of the application system unit 103.

1304 executes socket layer processing of application communication, and exchanges data of the application to be sent/received via the socket interface 1303. In addition, when TCP communication processing is performed by 1305, communication data is exchanged between 1304 and 1305. In TCP communication that executes socket layer processing by 1304, the amount of data sent/received in each TCP socket is measured. In this measurement processing, the amount of data inputted/outputted to/from a socket sending/receiving buffer (within the RAM 114) is measured per set amount of time, for all instances of application communication, and the socket switch process module in 1310 is notified of the results of the measurement.

On the other hand, in the case where the application communication is communication that utilizes UDP, the socket layer processing is executed by 1304. Moreover, UDP packet sending processing is executed in the TCP/IP protocol process module 1305. UDP packet receiving processing is executed by the process module 1307, and shall be mentioned later. Accordingly, 1304 exchanges UDP packet data with 1307.

The TCP/IP process module of 1305 primarily executes TCP protocol processing in TCP communication and sending processing in UDP communication, or upper IP layer protocol processing aside from TCP and UDP. In addition, the TCP/IP process module 1305 also executes processing of protocols such as ICMP, ARP, and the like, which are not directly used in application communication but are necessary for performing TCP/IP communication.

Furthermore, 1305 monitors transition in the state of a TCP connection during the connection establishment/closing phases of TCP communication. The TCP connection state refers to the state of progress of TCP communications as denoted in RFC-793. In general, the states of a TCP connection during the connection establishment phase are called SYN_SENT and SYN_RCVD. During the connection closing phase, there are states called FIN_WAIT1, FIN_WAIT2, CLOSING, TIME_WAIT, CLOSE_WAIT, and LAST_ACK. The state in which there is no connection in the TCP socket is called CLOSED. In other words, when application communication (TCP communication) is in a TCP connection state such as described above, TCP protocol processing is executed by the TCP/IP process module 1305.

Furthermore, in 1305, the number of TCP packets sent/received is measured per set amount of time for all TCP connections in an ESTABLISHED state, and the socket switch process module 1310 is notified of the measurement results.

In FIG. 8, 1306 to 1309 represent process modules of the network communication unit 102; 1306 to 1308 are executed by the protocol processing unit 107.

1306 is a TCP socket layer process module. While the aforementioned socket layer process module 1304 is a software process executed by the CPU 112, the TCP socket layer processing module 1306 is a process executed by the protocol processing unit 107, and is capable of high-speed processing. This TCP socket layer processing is executed in the case where the application communication is communication that utilizes TCP and the TCP connection is in the establishment phase. At this time, the TCP connection is in a state called ESTABLISHED. 1306 executes exchange of data to be sent/received in application communication via the socket interface 1303. The amount of data sent/received in a TCP socket that performs socket layer processing is measured by 1306. In this measurement processing, the amount of data inputted/outputted to/from a socket sending/receiving buffer (within the local RAM 106) is measured every set amount of time, for all instances of application communication, and the socket switch process module 1310 is notified of the results of the measurement.

1307 primarily executes TCP protocol processing in the ESTABLISHED state or UDP protocol processing at the time of UDP packet receiving. Furthermore, 1307 exchanges communication data with either 1304 or 1306, which are socket process modules of the higher layer. However, data exchange with 1304 occurs only in the case of receiving UDP packets, while data exchange with 1306 occurs only in the case of TCP communication. At the time of sending in application communication, 1307 accepts, from 1306, data to be sent. Conversely, at the time of receiving, 1307 passes, to 1306, data to be received.

In addition, in TCP communication in the ESTABLISHED state processed by 1307, the number of TCP packets sent/received is measured each set period of time, and the socket switch process module 1310 is notified of the measurement results.

1308 is a process module executed within the network communication unit 102. When a TCP packet is sent by the TCP process module 1307, 1308 creates and attaches an IP header thereto, thereby creating an IP packet. When receiving an IP packet, the header structure of the received packet is analyzed, and the data of the received packet is passed to one of the process modules 1305 and 1307.

The received packet analysis processing identifies the data structure of the frame received from the communication control unit 105, and reads out the protocol header area of the network layer and the transport layer. In the case where the frame data includes an IP packet, the type of the upper-layer protocol and the IP addresses of the origin and destination are acquired; furthermore, in the case where UDP packets, TCP packets, and the like are included in the upper-layer protocol, the port number specified in the origin and destination is acquired. Then, through a predetermined determining processing, it is determined, based on the acquired information, whether the frame data is to be received by 1305 or 1307. Along with this determination, the data is transferred to one of the RAM 114, which has a buffer for 1305 to process the received frame data, and the local RAM 106, which has a buffer for 1307 to process the received frame data.

Note that frame data that does not include data in the IP packet format, such as an ARP frame, is sent/received by the TCP/IP protocol process module 1305. By analyzing the received packets, in the case where such frame data is received, the frame data is passed to the application system unit.

In FIG. 8, the process in 1309 is a link layer process of network communication. This process sends/receives frame of a wired LAN (for example, IEEE 802.3) or wireless LAN (for example, IEEE 802.11a/b/g) protocol. Furthermore, this process executes control of the communication control unit 105, and sends/receives frame data to/from the network 118.

In FIG. 8, 1310 is a socket switch process module, and is a process that manages the processing resources of TCP/IP communication throughout the entire application device system. 1310 manages the allocation of the number of instances of communication that can be processed by the network communication unit. It should be noted that in the present embodiment, 1310 is described as being executed by the internal control processor 109 that is within the network communication unit 102. However, 1310 may be executed through hardware processing by the protocol processing unit 107.

1310 determines, per instance of application communication that utilizes the socket interface 1303, whether the socket layer processing of the application system unit or the socket layer processing of the network communication unit should be executed, and executes switch processing based thereon. Information necessary for the determination of switching the socket layer process is communicated by 1304, 1305, 1306, and 1307. In the case where the application communication uses TCP as the lower-layer protocol, the state of the TCP connection is monitored and the socket switch process module 1310 is notified of a change therein, in the processing performed by 1305 and 1307. Based on this notification, the socket switch process module 1310 switches between processing by the application system unit 103 performed by 1304 and 1305 and processing by the network communication unit 102 performed by 1306 and 1307, for the TCP protocol processing of each instance of application communication. Furthermore, the socket switch process module 1310 manages the number of TCP connections for which communication processing can be performed by the network communication unit 102. This management limits the total number of TCP sockets for which TCP protocol processing is executed by 1306 and 1307 in the network communication unit 102 so as not to exceed a predetermined upper limit number.

Next, switching of TCP protocol processing performed by the network communication unit 102 and the application system unit 103 in TCP communication shall be described.

Figure 10:
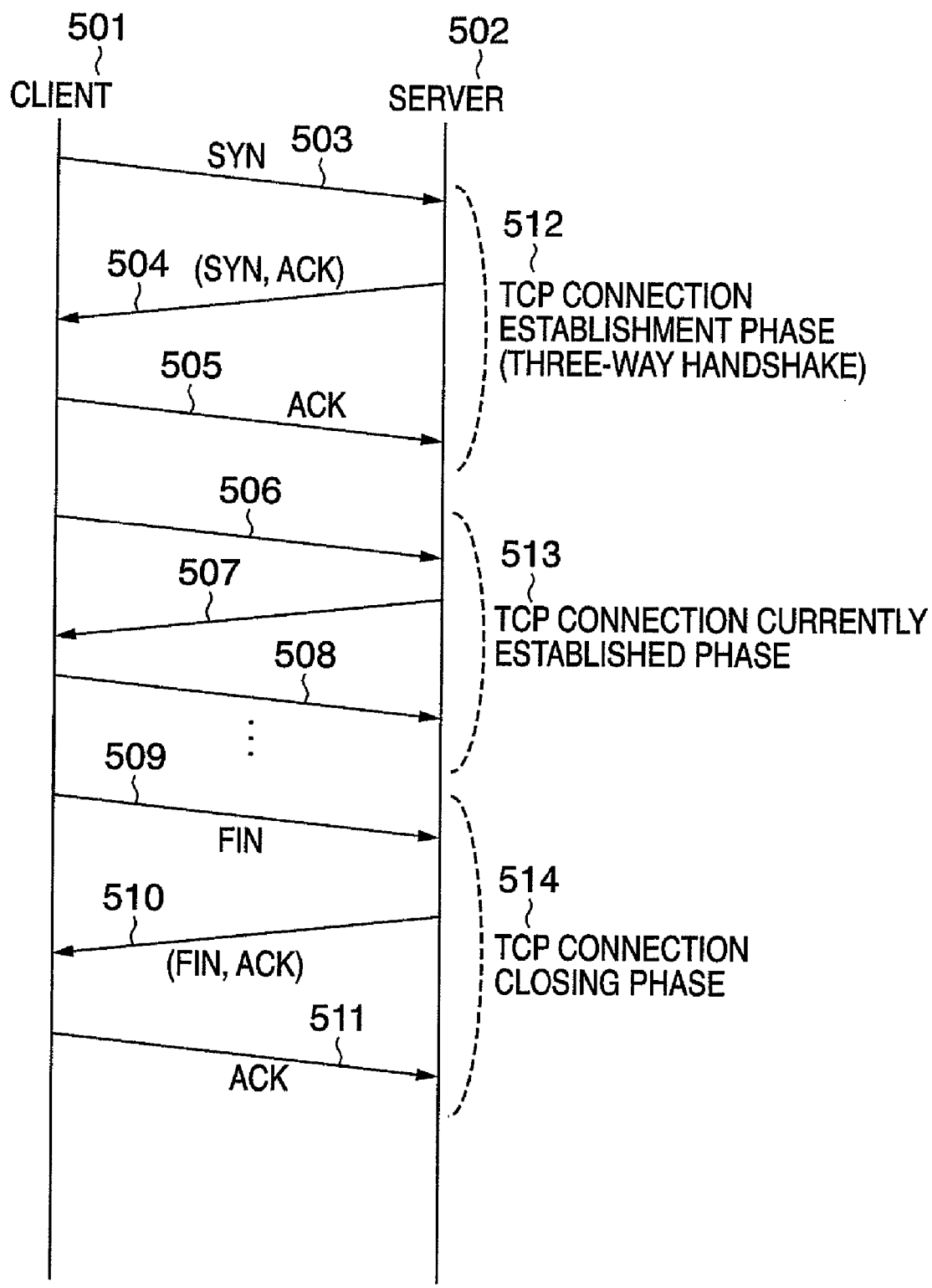
FIG. 10 is a diagram showing an example of the flow of TCP communication.

FIG. 10 is a diagram showing a simplified example of the flow of TCP communication. FIG. 10 shows communication in which a client 501 and a server 502 establish a TCP connection, send and receive data, and close the connection. The client 501 represents the requesting side, which requests the opening of the TCP connection.

A TCP connection establishment request 503 is sent from the client 501, and upon receiving this request, the server 502 returns an acknowledgment 504 in response to the establishment request. The connection establishment request 503 is a packet in which the SYN bit in the control bit field of the TCP packet header is 1, and therefore is simple called a SYN packet. Similarly, the acknowledgment in response to the establishment request is a packet in which the SYN and ACK bits in the control bit field of the TCP packet header are 1. Upon receiving the (SYN, ACK) packet 504, the client 501 sends an acknowledgment (ACK) 505. Phase 512, in which these three TCP packets are sent and received, is communication occurring during general TCP connection establishment, and is called a three-way handshake.

In the case where a TCP connection is being established between the client 501 and the server 502, both send and receive application data. In FIG. 10, the arrows 506 to 508 indicate data sending and receiving in phase 513, in which the connection is being established.

The client 501 sends a packet 509 that requests the connection to be closed. 509 is a packet in which the FIN bit in the control bit field of the TCP packet header is 1. Upon receiving the connection closing request 509, the server 502 sends a TCP packet (FIN, ACK) 510, which indicates an acknowledgment in response to the closing request from the client 501, and which also indicates a closing request from the server 502 side itself. Upon receiving the TCP packet 510, the client 501 sends an acknowledgment (ACK) 511. Communication in the connection closing phase is performed through the communication procedure of phase 514.

In the present embodiment, phase 512 of establishing a connection, as shown in the TCP communication flow example in FIG. 10, and the TCP protocol processing in phase 514 of closing the connection, are performed by the application system unit 103. These are executed by the network communication unit 102 or the application system unit 103 in phase 13 during connection establishment. In other words, in application communication that utilizes TCP, the processing unit that executes TCP protocol processing is switched in accordance with the state of the TCP connection.

How TCP communication processing is executed by the network communication unit 102 and the application system unit 103, and how TCP protocol processing is switched per TCP connection, shall be explained using the TCP communication flow shown in FIG. 10 as an example. This explanation shall refer to FIGS. 11 to 20.

Figure 11:
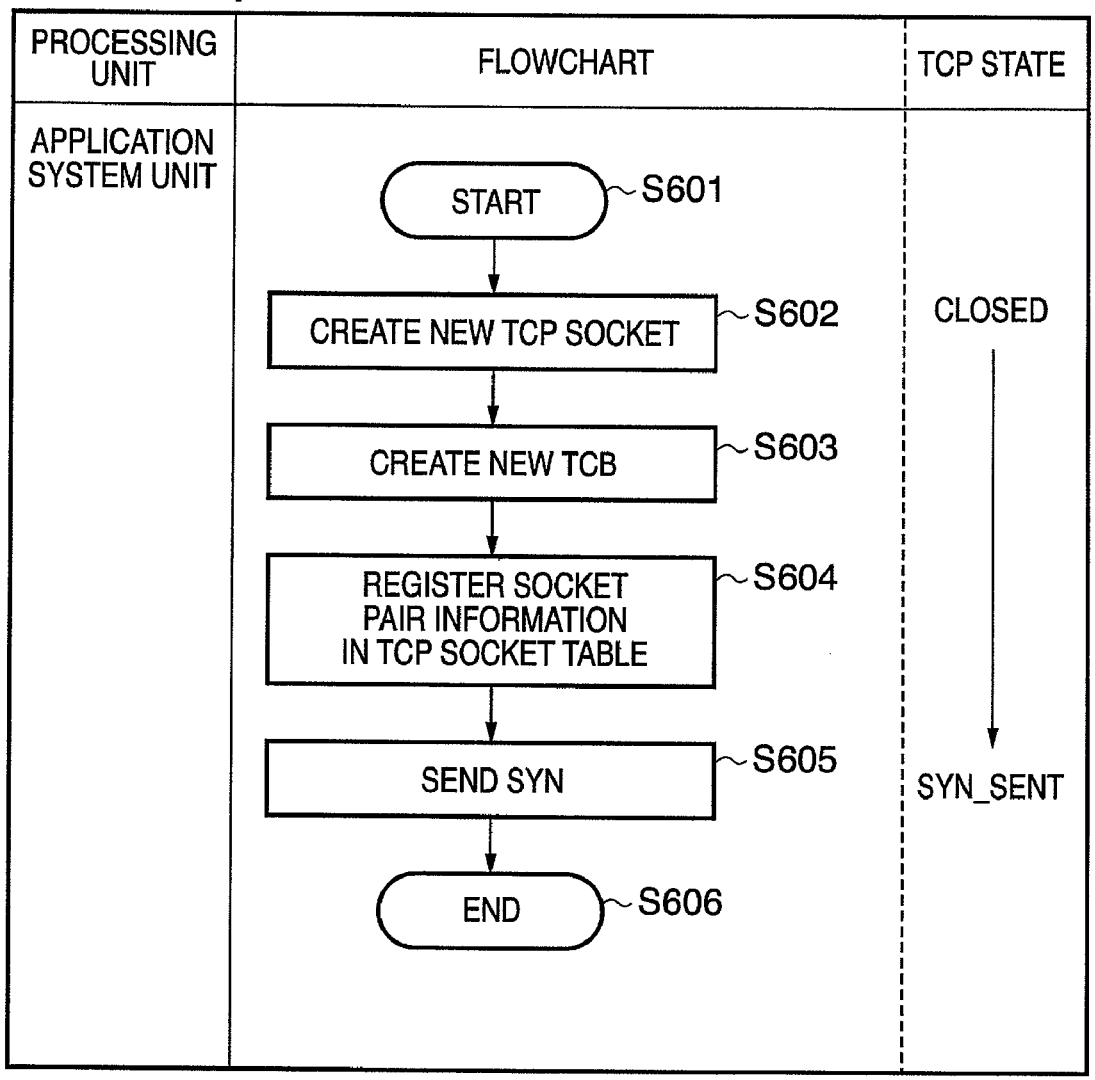
FIG. 11 is a diagram showing a SYN sending process when a TCP socket is in a CLOSED state.

First, the case where a request to open a TCP connection is made by the application device 101 shall be explained with reference to FIG. 11. FIG. 11 shows a flowchart for the side that requests establishment of a TCP connection, i.e. the client 501. The "processing unit" column on the left side of FIG. 11 indicates which of the network communication unit 102 and the application system unit 103 execute the processing of each step in the flowchart. In other words, in FIG. 11, all processing steps are performed solely within the application system unit 103. Moreover, progressing through states, as seen in RFC-793, occurs in TCP communication; thus, the progress of the state of the TCP connection in accordance with the flowchart is shown in the "TCP state" column on the right side of FIG. 11.

The processing flow of a request to establish a TCP connection starts with S601. In S602, a new TCP socket for performing TCP communication is generated (created). At this time, a sending buffer and a receiving buffer used by the TCP socket are each secured within the RAM 114.

Next, in S603, a TCP control block (TCB) for the TCP communication to be commenced is generated (created). The TCB is context information for controlling TCP communication (TCP control information), and is aggregate data of several tens of parameters. TCBs are generated per TCP connection, and are bound to TCP sockets and managed. When each TCP communication processing is performed, the value of each parameter in the TCB is referred to, updated, and used. In S603, the application system unit 103 creates the TCB in the RAM 114. Next, in S604, socket pair information is registered in a TCP socket table. Socket pair information is a set of the IP addresses and TCP port numbers of both endpoints in a TCP connection. In this case, the socket pair information is a set of the IP address and port number for opening a TCP connection in the application device 101, and the IP address and port number of a communication partner. The TCP socket table is a database in which the socket pairs of all instances of TCP communication (including TCP connections in the establishment and closing phases) being processed by the application device 101 are registered.

The TCP socket table is managed by the protocol processing unit 107 within the network communication unit 102. A number of the TCP socket being used by each socket pair, and information indicating which of the network communication unit 102 and the application system unit 103 is currently performing processing, are also stored in the TCP socket table, along with the socket pair information.

Registration/deletion of socket pair information to/from the TCP socket table is executed by software (a driver) executed by the CPU 112 within the application system unit 103. At the stage of S604, the newly-created TCP socket does not yet have a connection, and thus the TCP state is in the CLOSED state. Next, in S605, a SYN packet is sent, and the communication partner is requested to open a TCP connection. In other words, 503, indicated in the communication flow indicated in FIG. 10, is sent. Next, the procedure moves to S606 and the processing flow ends; however, due to the SYN sending in S605, the TCP state progresses from CLOSED to SYN_SENT.

Figure 12:
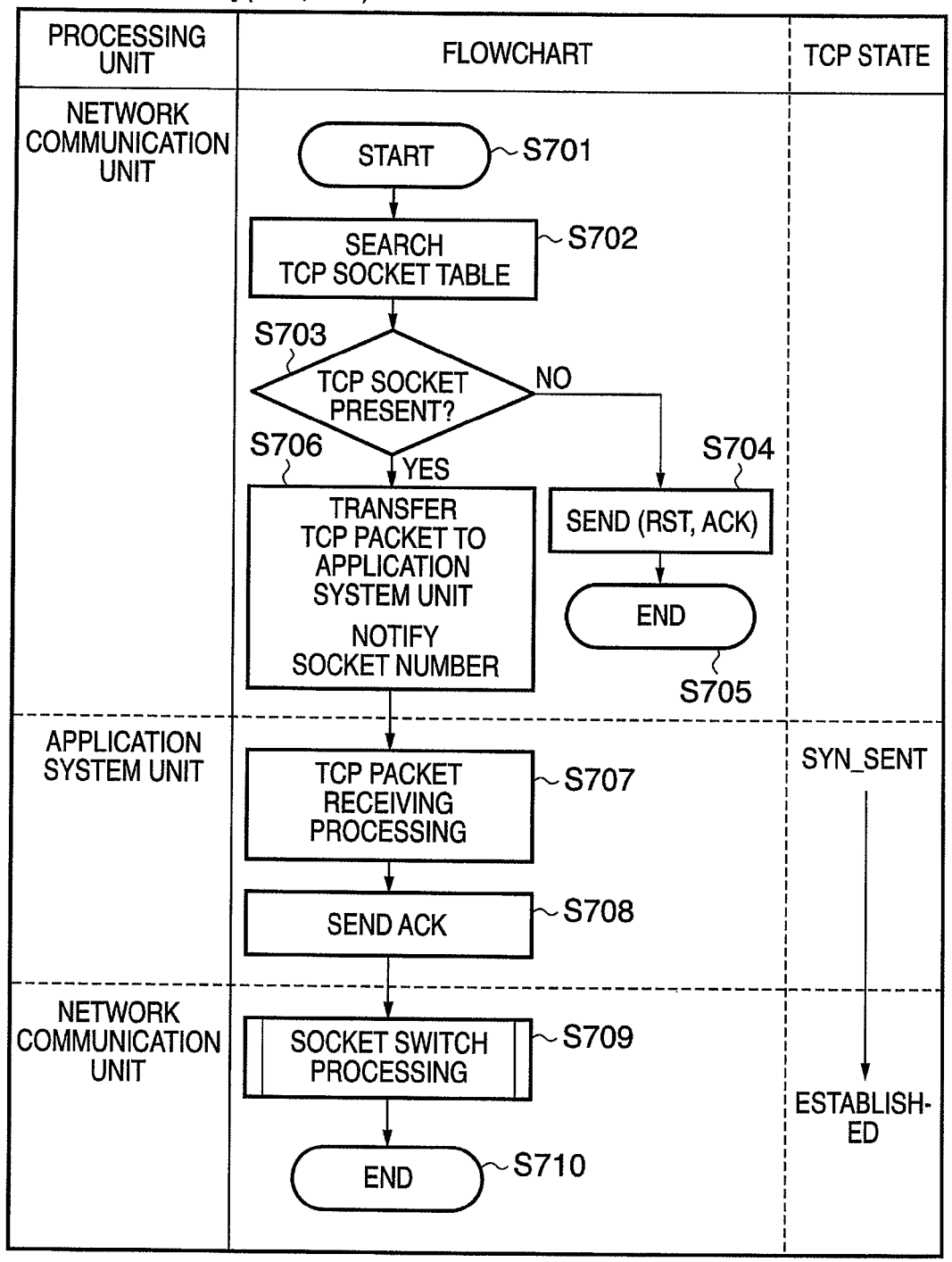
FIG. 12 is a diagram showing a (SYN, ACK) receiving process when a TCP socket is in a SYN_SENT state.

Next, a processing flow occurring when, in the SYN_SENT state occurring after sending of the connection establishment request (SYN), an acknowledgment (SYN, ACK) is received in response from the communication partner to the SYN, shall be explained with reference to the flowchart of FIG. 12.

The procedure starts with S701. In S702, the network communication unit 102 analyzes the header structure of the received TCP packet, acquires the socket pair information, and searches the TCP socket table. In S703, the network communication unit 102 determines whether a TCP socket that should receive the packet is present. The processing in S702 is executed by the process modules 1307 and 1308 in FIG. 8. In other words, the socket pair information is acquired by 1308 reading out the header information of the TCP packet, and 1307 is then notified of the socket pair information. Then, the process module 1307 searches the TCP socket table, determines whether a socket that should receive the packet is present, and returns the search result to 1308. In S703, the procedure moves to S704 when a TCP socket capable of receiving the TCP packet to be received is not present, and moves to S706 when a TCP socket capable of receiving the TCP packet to be received is present.

In S704, the received packet cannot be accepted, and thus an (RST, ACK) packet, indicating a forced reset, is sent to the TCP socket that is the origin of the TCP packet. This packet is a packet in which the RST bit and ACK bit have been set in the control bit of the TCP header. The returned TCP packet is created by the process module 1307 in FIG. 8. In the case where the (RST, ACK) packet is sent in S704, the procedure moves to S705 and ends.

When the procedure has moved from S703 to S706, a TCP socket capable of receiving the TCP packet to be received is present. Because the TCP socket is in the SYN_SENT state, receiving is executed by the application system unit 103, and therefore in S706, the received TCP packet is transferred to the application system unit 103. In addition, the TCP/IP process module 1305 is notified of the socket number found during the TCP socket table search. In S706, the packet is processed by the process module 1308 in FIG. 8, and is transferred to the packet receiving buffer of the RAM 114 within the application system unit 103.

Next, moving to S707, processing for receiving the TCP packet is performed, and the, moving to S708, an acknowledgment packet (ACK) is sent. Sending of this acknowledgment packet is sending of the TCP packet indicated by 505 and ACK in FIG. 10. The processing in S707 and S708 is performed by the TCP/IP process module 1305 in FIG. 8. In other words, these steps are executed within the application system unit 103.

When the acknowledgment packet in sent in S708, the procedure moves to S709, and socket switch processing is executed. In S709, a notification is provided from the TCP/IP process module 1305 in FIG. 8 to the socket switch process module 1310, and the socket layer processing and TCP protocol processing for that TCP is switched so as to be performed by the network communication unit 102 thereafter. The TCP socket number, memory addresses of the sending buffer and receiving buffer linked to the TCP socket, and TCB information are included in the notification to the socket switch process module 1310. As a method for performing a notification of the TCB, the memory address of the TCB data presenting the RAM 114 may be communicated, or the details of the TCB data may be communicated. Note that hereinafter, notifications to the socket switch process module 1310 include these pieces of information.

It should be noted that the processing performed by the socket switch process module 1310 does not necessarily switch the protocol processing for the TCP packet so as to be processed within the network communication unit 102. In the case where the number of TCP connections that can be processed by the network communication unit 102 exceeds an upper limit, the switch processing is not executed. In this case, TCP communication processing is executed within the application system unit 103.

When the switch processing for the process module of the TCP socket in S709 ends, the procedure moves to S710, and the processing flow for receiving a (SYN, ACK) packet ends normally. At this time, the TCP state of the TCP connection progresses from SYN_SENT to ESTABLISHED, as indicated by the column on the right side of FIG. 12.

Thus far, the processing details in the case where, in phase 512 of TCP connection establishment indicated in FIG. 10, the application device 101 requests a connection to be opened in the manner of the client 501 side in FIG. 10, have been explained with reference to FIGS. 11 and 12.

Next, the case where, in phase 512 of TCP connection establishment indicated in FIG. 10, the application device 101 accepts a request to open a TCP connection in the manner of the server 502 in FIG. 10, shall be explained. Generally, in TCP communication, it is necessary to stand by using a TCP socket in the LISTEN state in order to accept a connection establishment request from a communication partner. With the application device 101 of the present embodiment, information of all TCP sockets that are accepting connection establishment requests (SYN) are held in a database called a LISTEN table. The LISTEN table is managed by the protocol processing unit 107 within the network communication unit 102. The application performing TCP communication creates a TCP socket in the LISTEN state in order to standby for a TCP connection establishment request. This process shall be explained with reference to the flowchart in FIG. 13.

Figure 13:
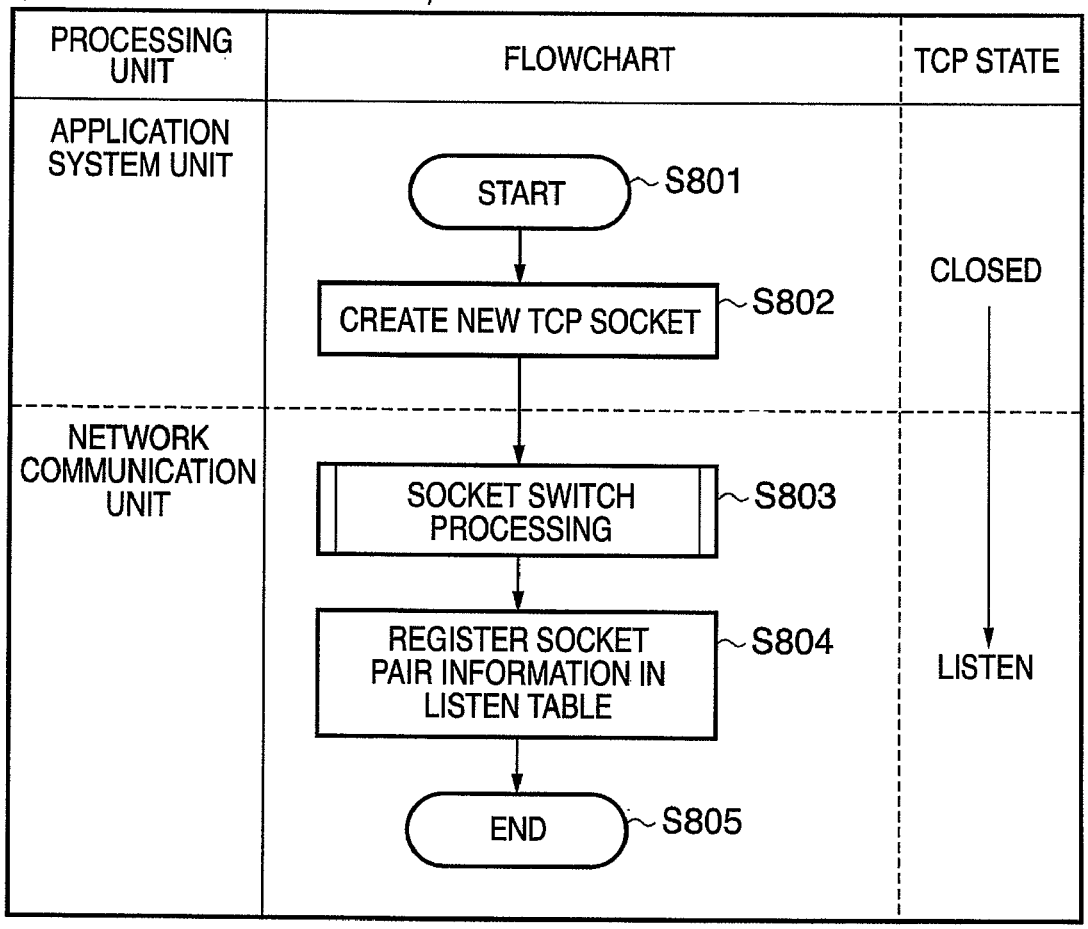
FIG. 13 is a diagram showing a process of creating a TCP connection establishment request standby socket.

In FIG. 13, the process starts with S801. In S802, a new TCP socket is generated (created) in accordance with instructions for a TCP socket to be generated and for a move to a connection standby state, the instructions being performed by the application. The TCP socket created in S802 is in the CLOSED state. In order to put the created TCP socket in the LISTEN state, an instruction for registration in the LISTEN table is communicated to the socket switch process module 1310. A set including the number of the socket that accepts the connection establishment request and the local IP address and TCP port number for standby are attached to the instruction for registration. The processing up until this point is performed by the TCP socket layer processing module 1304 within the application system unit 103.

Next, the procedure moves from S802 to S803; the processing unit of the newly-generated TCP socket is switched by the socket switch process module 1310, and therefore TCP protocol processing is performed within the network communication unit 102. Next, in S804, the TCP process module 1307 in FIG. 8 registers socket pair information and the TCP socket number in the aforementioned LISTEN table, the socket pair information being a set of a local IP address and port number standing by for the TCP connection establishment request. The procedure then moves to S805 and ends. Through such processing, the new TCP socket progresses from the CLOSED state to the LISTEN state.

When a request to open a TCP connection is received, the LISTEN table is searched using a set of the destination IP address and port number as a key, and it is determined whether an entry that matches the destination conditions is present. In other words, it is determined whether a registered TCP socket specified as the destination of the connection establishment request is present, and in the case where such a TCP socket is present, establishment of a TCP connection is possible.

Figure 14:
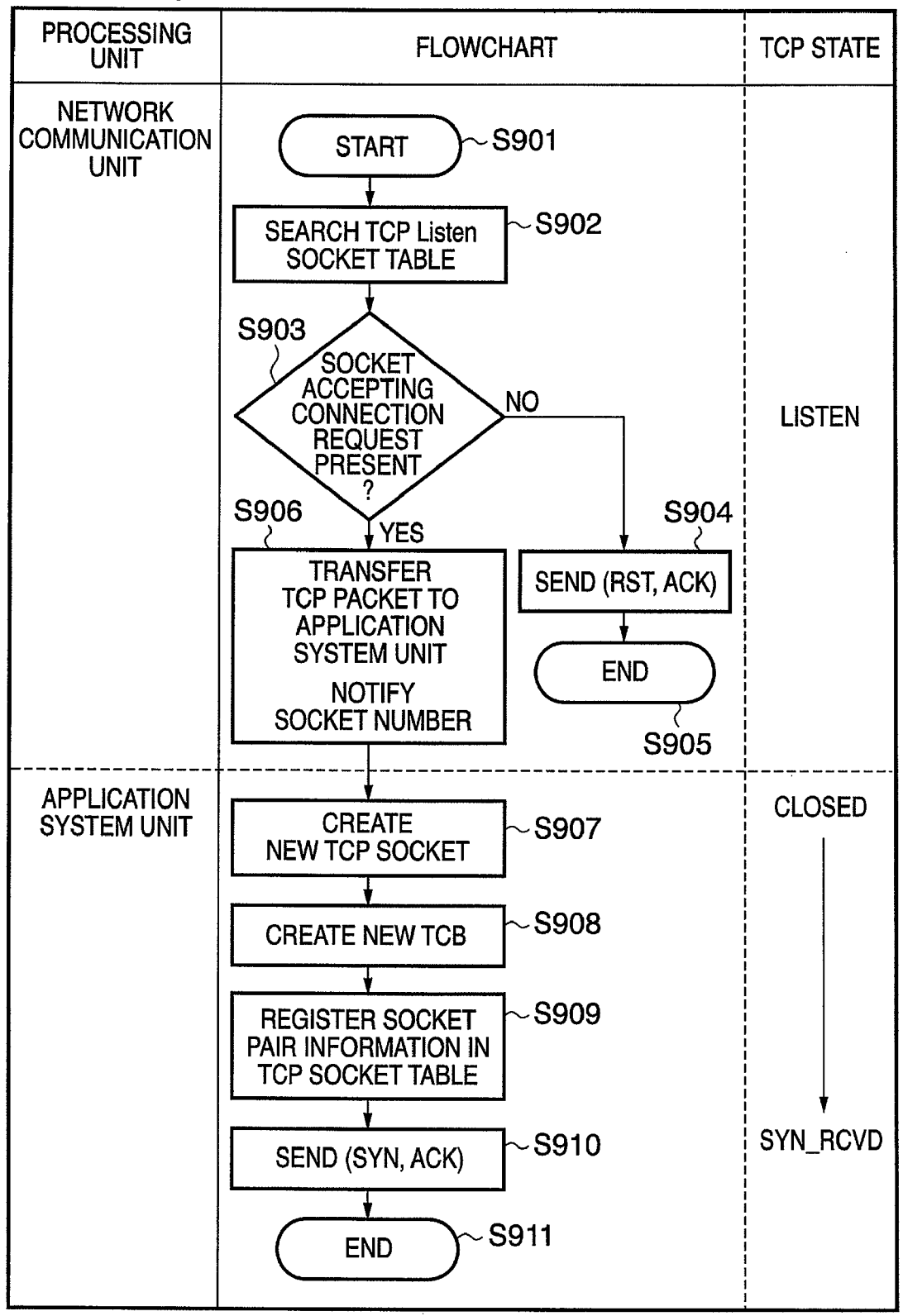
FIG. 14 is a diagram showing a SYN receiving process while in a LISTEN state.

Next, a processing flow occurring when a TCP packet requesting the establishment of a connection (SYN packet) is received from a communication partner in TCP communication shall be explained with reference to FIG. 14. The processing flow starts with S901. First, in S902, the header structure of the received TCP packet is analyzed, the socket pair information is acquired, and the LISTEN table (TCP Listen socket table) is searched, within the network communication unit 102. The processing in S902 is executed by the process modules 1307 and 1308 of FIG. B. The socket pair information is acquired by 1308 reading out the header information of the TCP packet, and 1307 is then notified of the socket pair information. Then, the process module 1307 searches the LISTEN table, determines whether the socket that is to receive is present, and returns the search result to 1308.

In S903, in the case where a TCP socket in the LISTEN state capable of receiving the received TCP packet (SYN packet) is not present, or in other words, the case where a TCP socket that can accept a connection establishment request is not present, the procedure moves to the processing in S904. In the case where such a TCP socket is present, the procedure moves to the processing in S906. To rephrase, in S903, it is determined whether or not a TCP socket accepting a connection request is present. In S904, the received packet cannot be accepted, and thus a (RST, ACK) packet, indicating a forced reset, is sent to the TCP socket that is the origin of the TCP packet; the procedure then moves to S905 and ends.

When the procedure has moved from S903 to S906, a TCP socket capable of receiving the received TCP packet is present. In S906, the received TCP packet is transferred to the application system unit 103. In S906, the packet is processed by the process module 1308 in FIG. 8, and is transferred to the packet receiving buffer of the RAM 114 within the application system unit 103. In addition, the TCP/IP process module 1305 is notified of the socket number found during the LISTEN table search.

Next, the procedure moves to S907. The processing flow from S907 is executed by the application system unit 103. In S907, a new TCP socket for establishing a TCP connection is created, and next, in S908, a new TCB is created, the TCB being used in communication utilizing the TCP socket. At this time, a sending buffer and a receiving buffer used by the TCP socket are each secured within the RAM 114. Next, in S909, socket pair information of the newly-created TCP socket is registered in a TCP socket table. The processing for registration into the TCP socket table in S909 is similar to the processing of S604 in FIG. 11, executed in the case where the application device 101 requests a TCP connection to be opened, and therefore detailed descriptions thereof shall be omitted. After S909, the procedure moves to S910, in which a TCP packet (SYN, ACK), which is an acknowledgment in response to the connection establishment request, is sent by the TCP process module 1307. The sent TCP packet is indicated by 504 in FIG. 10.

As described thus far, a newly-generated TCP connection progresses from the CLOSED state to the SYN_RCVD state due to the processing in S910.

Next, a processing flow in the case where an acknowledgment (ACK) has been received from a communication partner in a TCP connection that has progressed to the SYN_RCVD state after sending of a (SYN, ACK) TCP packet shall be explained with reference to FIG. 15. In the processing flow of FIG. 15, the received TCP packet corresponds to the acknowledgment (ACK) packet indicated by 505 in the communication flow in FIG. 10.

Figure 15:
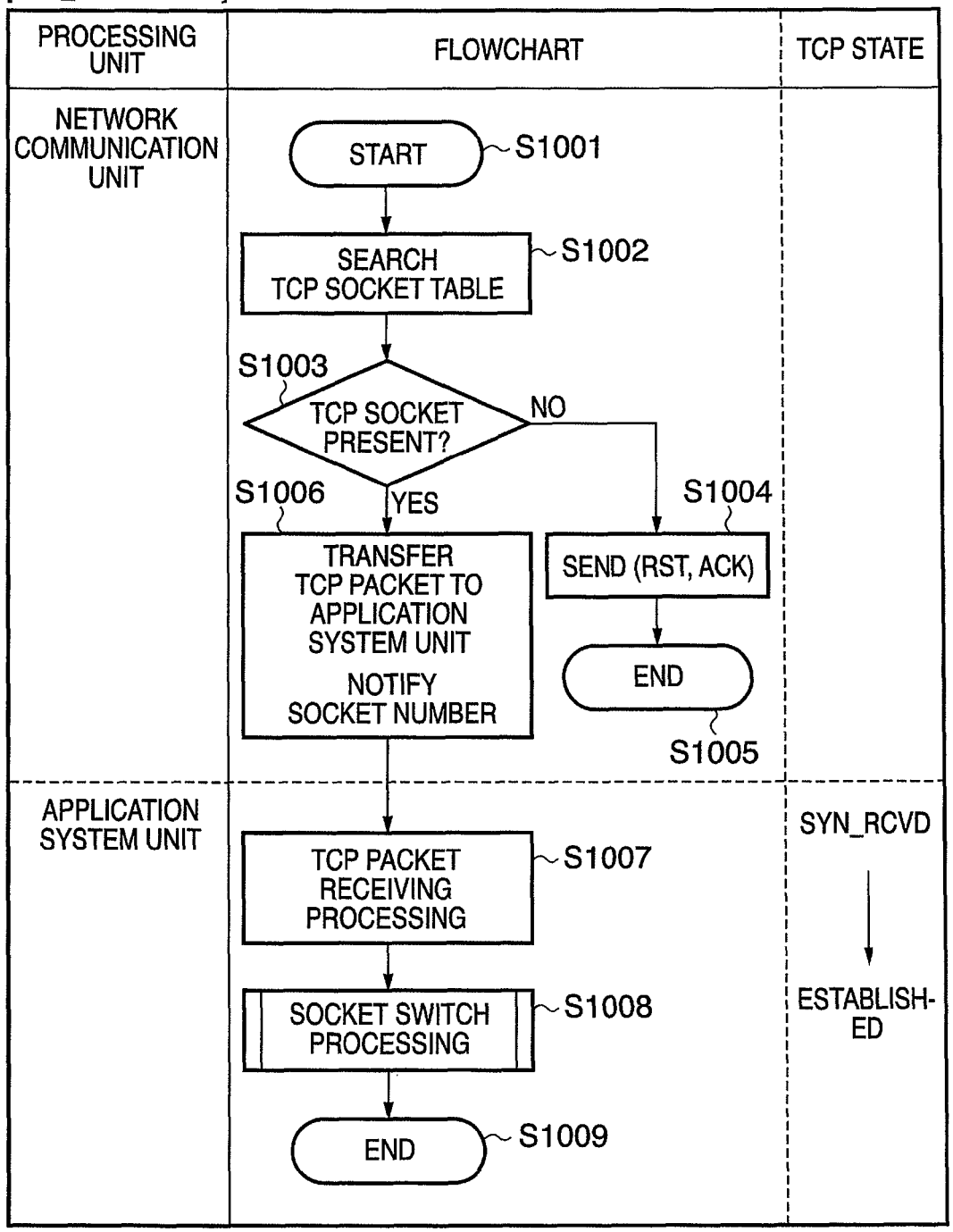
FIG. 15 is a diagram showing an ACK receiving process when a TCP socket is in a SYN_RECV state.

The processing flow in FIG. 15 starts with S1001. In S1002, the network communication unit 102 analyzes the header structure of the received TCP packet, acquires the socket pair information, and searches the TCP socket table. In S1003, the network communication unit 102 determines whether a TCP socket that should receive the packet is present. The processing in S1002 is the same as the processing in the aforementioned S702 of FIG. 12. In S1003, the procedure moves to S1004 when a TCP socket capable of receiving the TCP packet is not present, and moves to S1006 when a TCP socket capable of receiving the TCP packet is present. In S1004, the TCP packet cannot be accepted, and thus a (RST, ACK) packet, indicating a forced reset, is sent to the TCP socket that is the origin of the TCP packet; the procedure then moves to S1005 and ends.

When the procedure has moved from S1003 to S1006, a TCP socket capable of receiving the TCP packet to be received is present. In S1006, the received TCP packet is transferred to the application system unit 103. The socket number is also notified. S1006 executes the same processing as that of the aforementioned S706 of FIG. 12. Next, the procedure moves to S1007, and the received TCP packet undergoes receiving processing.

Then, the procedure moves to S1008, and socket switch processing is executed. In S1008, a notification is provided from the TCP/IP process module 1305 in FIG. 8 to the socket switch process module 1310, and the socket layer processing and TCP protocol processing for that TCP is switched so as to be performed by the network communication unit 102 thereafter. This step S1008 executes the same processing as that of the aforementioned S709.

It should be noted that the processing performed by the socket switch process module 1310 does not necessarily switch the protocol processing for the TCP packet so as to be processed within the network communication unit 102. In the case where the number of TCP connections that can be processed by the network communication unit 102 has reached an upper limit, the switch processing is not executed. In this case, TCP communication processing is executed within the application system unit 103.

When the switch processing for the process module of the TCP socket in S1009 is completed, the procedure moves to S1009, and the processing flow for the received TCP packet (ACK) ends normally. At this time, the TCP state of the TCP connection progresses from SYN_RCVD to ESTABLISHED, as indicated by the column on the right side of FIG. 15.

Thus far, the processing details in the case where, in phase 512 of TCP connection establishment indicated in FIG. 10, the application device 101 is requested to open a connection in the manner of the server 502 side in FIG. 10, have been explained with reference to FIGS. 13, 14, and 15.

Next, processing details of sending/receiving data when the TCP connection is in the ESTABLISHED state shall be explained. This corresponds to the communication of phase 513 in the communication flow example shown in FIG. 10, in which the TCP connection is currently established. The state in which the TCP connection is currently established is called the ESTABLISHED state. In the present embodiment, TCP protocol processing is executed within the network communication unit 102 when each TCP connection is in the ESTABLISHED state, as explained earlier with reference to FIGS. 11 to 15.

Figure 16:
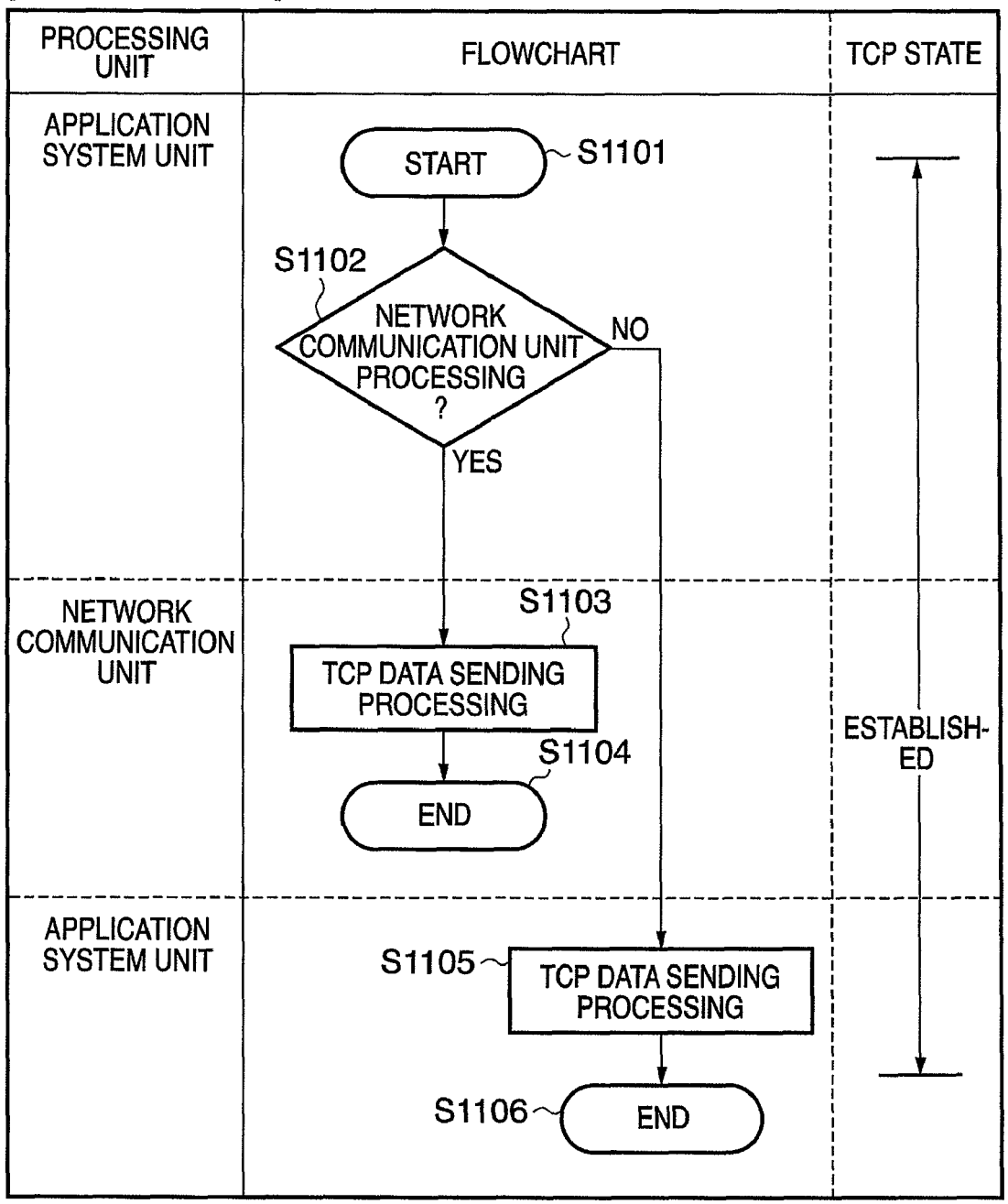
FIG. 16 is a diagram showing a data sending process when a TCP socket is in an ESTABLISHED state.

FIG. 16 is a processing flow of data sending when a connection is currently established, and indicates data sending processing in TCP communication in an ESTABLISHED state. In FIG. 16, the processing first starts with S1101. In S1102, it is determined whether or not the TCP socket processing is to be performed by the network communication unit 102. The processing in S1102 is performed by the socket interface 1303 in FIG. 8. In the case where the TCP socket layer process of the TCP communication has been switched by the socket switch process module 1310 so as to be processed within the network communication unit 102, the procedure moves to S1103. Otherwise, the processing is to be performed by the application system unit 103, and thus the procedure moves to S1105. S1103 and S1105 are both TCP data sending processes. Sending flow control, congestion control, processing of segmenting sending data, processing of resending TCP packets, and the like occurring at the time of data sending in TCP communication are performed in S1103 and S1105 of FIG. 16. Then, the procedure moves to S1104 or S1106 and ends.

Figure 17:
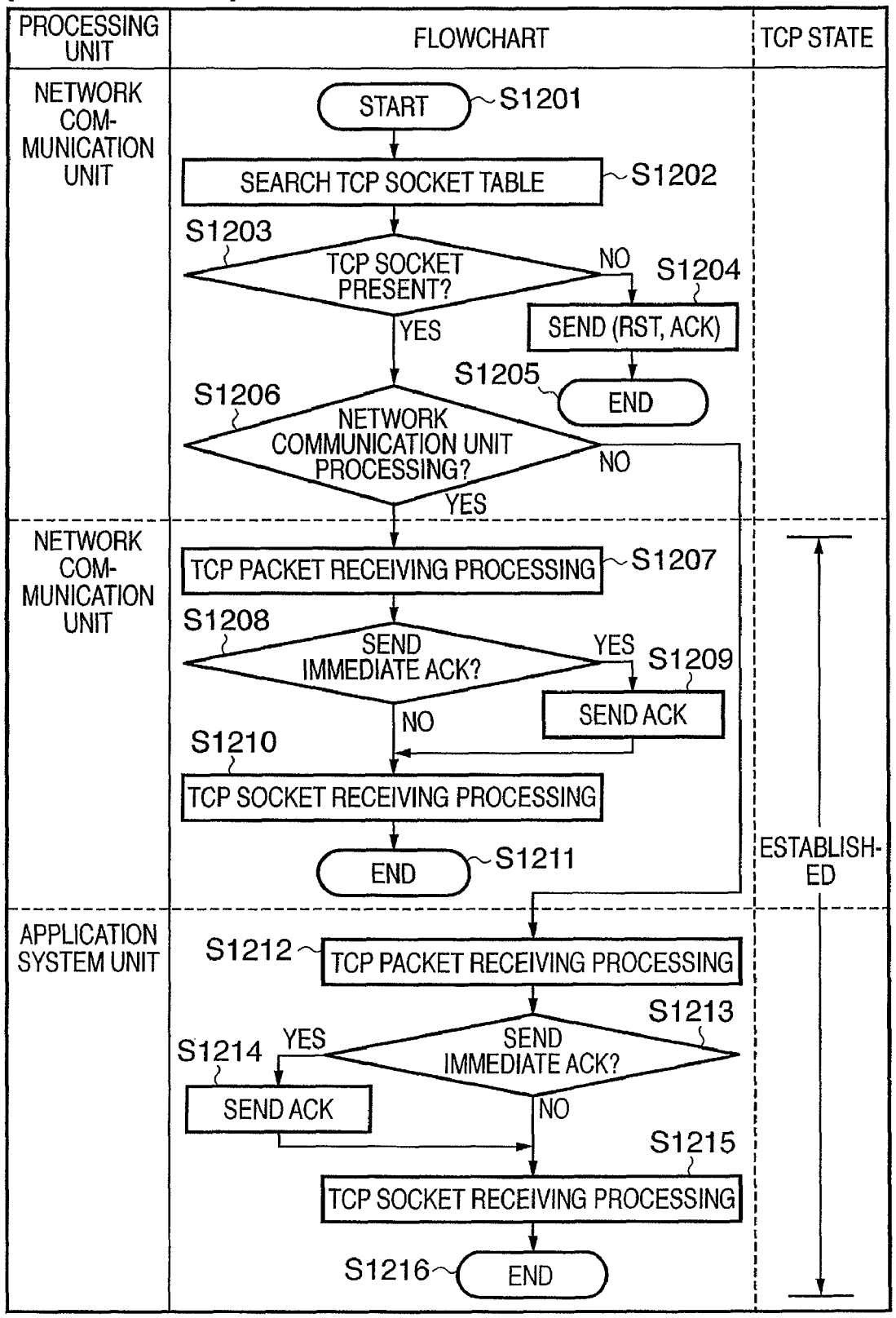
FIG. 17 is a diagram showing data receiving process when a TCP socket is in an ESTABLISHED state.

On the other hand, FIG. 17 is a processing flow at the time of receiving data while a connection is currently established. The procedure starts with S1201. In S1202, the network communication unit 102 analyzes the header structure of the received TCP packet, acquires the socket pair information, and searches the TCP socket table. In S1203, the network communication unit 102 determines whether a TCP socket that should receive the packet is present. The processing performed in S1202 is the same as the processing performed in the aforementioned S702 of FIG. 12. In S1203, the procedure moves to the processing in S1204 in the case where a TCP socket capable of receiving the received TCP packet is not present, and moves to the processing in S1206 in the case where a TCP socket capable of receiving the received TCP packet is present. In S1204, the received TCP packet cannot be accepted, and thus a (RST, ACK) packet, indicating a forced reset, is sent to the TCP socket that is the origin of the TCP packet; the procedure then moves to S1205 and ends.

When the procedure has moved from S1203 to S1206, a TCP socket capable of receiving the received TCP packet is present. In S1206, it is determined whether or not the processing unit that is to receive/process the received TCP packet is the network communication unit 102. In the case where the TCP socket layer process of the TCP communication has been switched by the socket switch process module 1310 in FIG. 8 so as to be processed within the network communication unit 102, the procedure moves to S1207. Otherwise, the processing is to be performed by the application system unit 103, and thus the procedure moves to S1212. S1207 to S1211 are processes performed by the network communication unit 102. On the other hand, S1212 to S1216 are processes performed by the application system unit 103.

In S1207, TCP protocol processing is executed for the received TCP packet (in other words, TCP packet receiving processing is performed). After the processing of S1207, in the case where, in S1208, an immediate ACK is required to be sent in response to the received TCP packet data, a receive acknowledgment (ACK) packet is sent in S1209, and the procedure then moves to S1210. In the case where the immediate ACK is not required to be sent, the procedure moves from S1208 to S1210. To rephrase, in S1208, it is determined whether or not sending of an immediate ACK is necessary. In S1210, receiving processing of the TCP socket layer (that is, TCP socket receiving processing) is performed. This processing is performed by the TCP socket layer processing module 1306 in FIG. 8; in this processing, the received data is transferred to a receiving buffer memory of the application, in response to a data receiving request obtained via the socket interface 1303 of the application. The procedure moves from S1210 to S1211, and the processing flow ends.

In the case where the procedure moves from S1206 to S1212, in S1212, TCP protocol processing is executed for the received TCP packet (in other words, TCP packet receiving processing is performed). After the processing of S1212, in the case where, in S1213, an immediate ACK is required to be sent in response to the received TCP packet data, a receive acknowledgment (ACK) packet is sent in S1214, and the procedure then moves to S1215. To rephrase, in S1213, it is determined whether or not sending of an immediate ACK is necessary. When sending of the immediate ACK is not necessary, the procedure moves from S1213 to S1215. In S1215, receiving processing of the TCP socket layer (that is, TCP socket receiving processing) is performed. This processing is performed by the TCP socket layer processing module 1304 in FIG. 8; in this processing, the received data is transferred to a receiving buffer memory of the application, in response to a data receiving request obtained via the socket interface 1303 of the application. The procedure moves from S1215 to S1216, and the processing flow ends.

Note that reordering (reconstruction) of the received data from the received packet, determination of ACK sending in response to the received data, sending window control based on receiving of an ACK from the communication partner, and the like are executed in S1207 and S1212.

Thus far, details of the processing of data sending/receiving by the application device 101 during phase 512 in FIG. 10, in which the TCP connection is currently established, have been explained with reference to FIGS. 16 and 17.

Next, the details of processing performed in the case where a request to close a TCP connection is made by the application device 101 shall be explained with reference to FIGS. 18 and 19. The explanations provided assume that communication operations are performed on the client 501 side in the connection closing phase 514 in the communication flow example of FIG. 10. First, a request to close the TCP connection is sent when the TCP connection is in the ESTABLISHED state. Then, an acknowledgment from the communication partner in response to the sent closing request, and the closing request from the communication partner are received, and finally, an acknowledgment to the closing request from the communication partner is sent.

Figure 18:
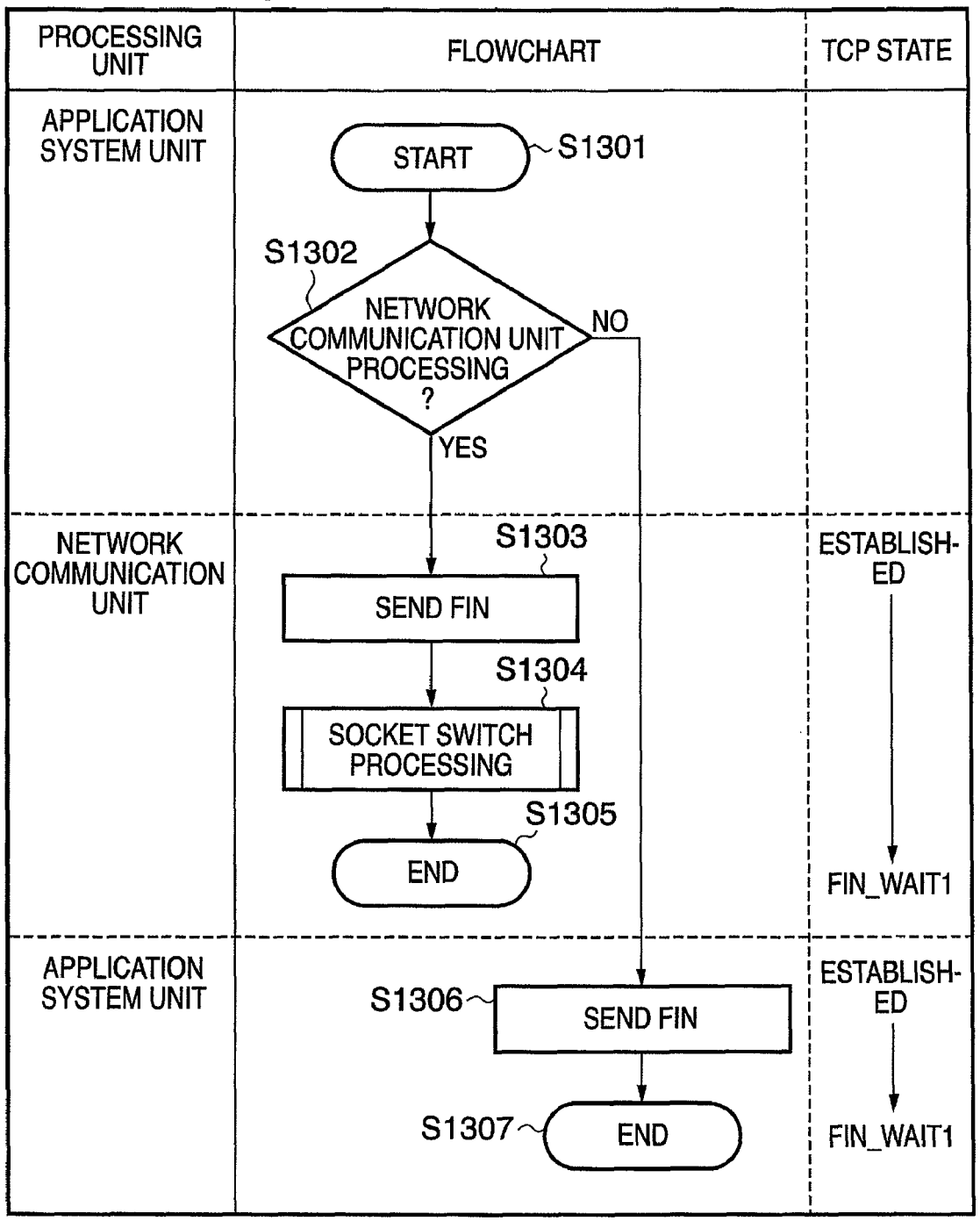
FIG. 18 is a diagram showing a FIN sending process when a TCP socket is in an ESTABLISHED state.

The processing flow in FIG. 18 commences with the application that uses the TCP socket in the ESTABLISHED state instructing the TCP socket to close via the socket interface 1303. The processing first starts with S1301. In S1302, it is determined whether or not the TCP socket processing is to be performed by the network communication unit 102. The processing in S1302 is performed by the socket interface 1303 of FIG. 8. In the case where the TCP socket layer process of the TCP communication has been switched by the socket switch process module 1310 so as to be processed within the network communication unit 102, the procedure moves to S1303. Otherwise, the processing is to be performed by the application system unit 103, and thus the procedure moves to S1306. S1303 to S1305 are processes performed within the network communication unit 102, whereas S1306 to S1307 are processes performed within the application system unit 103.

In S1303, A TCP packet requesting the TCP connection to close is sent. This is indicated by the FIN sending indicated by 509 in the communication flow example of FIG. 10. Sending of the request to close the TCP connection is executed by the TCP process module 1307 in FIG. 8. The sent TCP packet has a FIN bit of 1 in the control bit field of the TCP packet header.

Next, the procedure moves to S1304, where processing to switch the TCP socket is performed, so that the TCP protocol processing in the TCP connection is processed within the application system unit 103 thereafter. A notification is provided to the socket switch process module 1310 from the process module 1307 of FIG. 8, and the TCP socket processing moves from the network communication unit 102 to the application system unit 103. Accordingly, TCP protocol processing and socket layer processing in the TCP socket are executed by the process modules 1304 and 1305 of FIG. 8. The procedure then moves to S1305 and ends. The TCP state of the TCP connection progresses from ESTABLISHED to FIN_WAIT1.

In the case where the procedure moves from S1302 to S1306, first, in S1306, a TCP packet requesting the TCP connection to be closed is sent. This is indicated by the FIN sending indicated by 509 in the communication flow example of FIG. 10. Sending of the request to close the TCP connection is executed by the TCP/IP process module 1305 in FIG. 8. The procedure then moves to S1307 and ends. The TCP state of the TCP connection progresses from ESTABLISHED to FIN_WAIT1.

A TCP packet (FIN, ACK) indicated by the communication 510 in the communication flow example of FIG. 10 is received from the communication partner, the TCP packet (FIN, ACK) indicating both an acknowledgment in response to the connection closing request (FIN) sent earlier and a closing request from the communication partner. A processing flow at this time is shown in FIG. 19. As indicated in FIG. 18, a connection closing request (FIN) is first sent from the application device 101 side, and therefore in FIG. 19, the TCP state of the TCP connection is the FIN_WAIT1 state.

Figure 19:
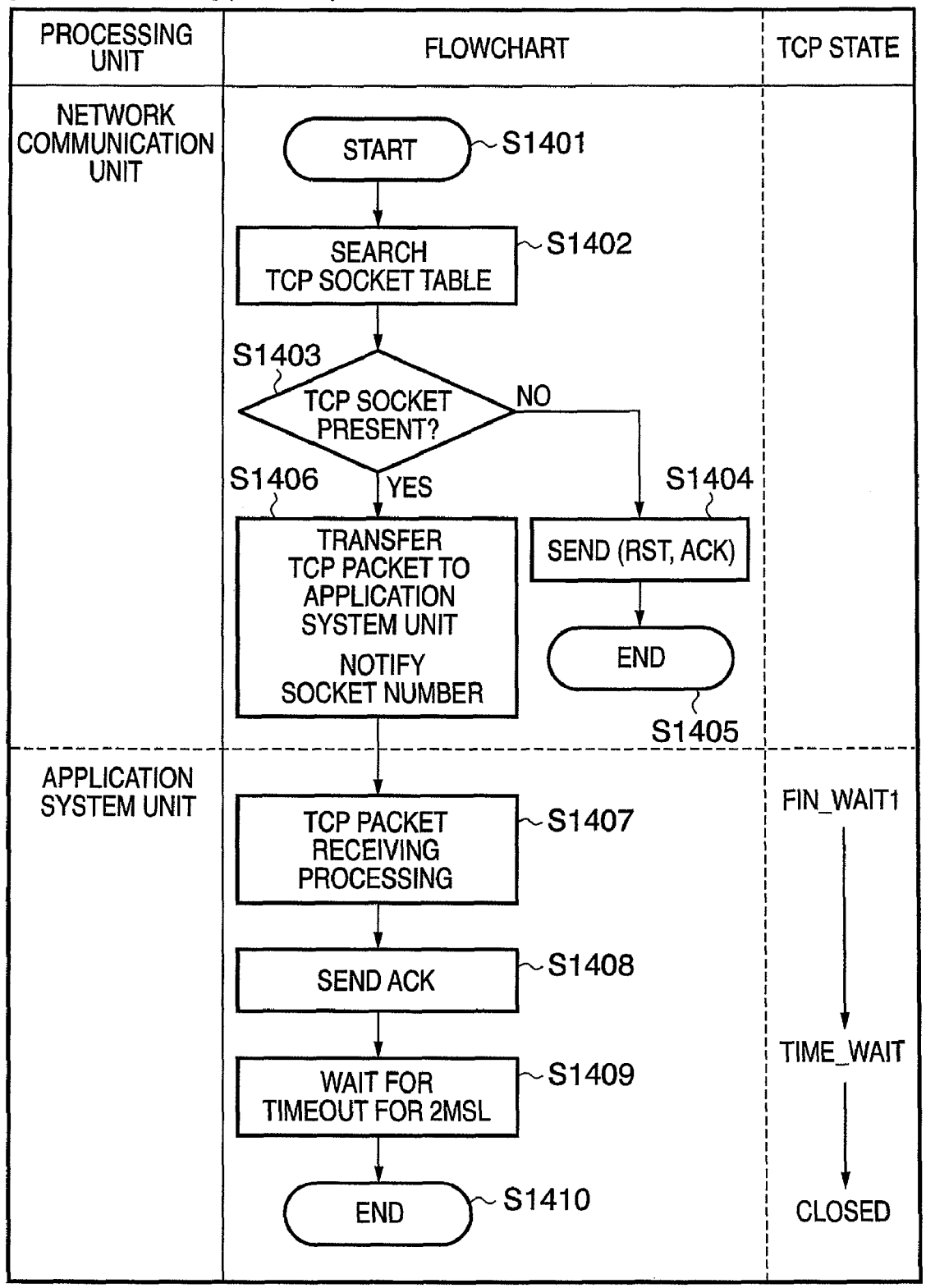
FIG. 19 is a diagram showing a (FIN, ACK) receiving process when a TCP socket is in a FIN_WAIT1 state.

The procedure in FIG. 19 starts with S1401. In S1402, the network communication unit 102 analyzes the header structure of the received TCP packet, acquires the socket pair information, and searches the TCP socket table. In S1403, the network communication unit 102 determines whether a TCP socket that should receive the packet is present. The processing performed in S1402 is the same as the processing performed in the aforementioned S702 in FIG. 12. In S1403, the procedure moves to S1404 when a TCP socket capable of receiving the TCP packet is not present, and moves to S1406 when a TCP socket capable of receiving the TCP packet is present. In S1404, the received TCP packet cannot be accepted, and thus a (RST, ACK) packet, indicating a forced reset, is sent to the TCP socket that is the origin of the TCP packet; the procedure then moves to S1405 and ends.

When the procedure has moved from S1403 to S1406, a TCP socket capable of receiving the received TCP packet is present. In S1406, the received TCP packet is transferred to the packet receiving buffer of the RAM 114 within the application system unit 103. In addition, the TCP/IP process module 1305 is notified of the socket number found during the TCP socket table search.

Next, the procedure moves to S1407. The steps from S1407 to S1409 are executed within the application system unit 103. In S1407, processing for receiving the TCP packet is performed, and because the TCP packet is a (FIN, ACK) packet from the communication partner, the procedure moves to S1408, and an acknowledgment (ACK) is sent. Sending of this acknowledgment packet is sending of the TCP packet indicated by 511 and ACK in FIG. 10. Through the processing steps performed thus far, the state of the TCP connection progresses from FIN_WAIT1 to TIME_WAIT.

S1409 is a state in which a timeout is waited for, in the TIME_WAIT state, for a 2MSL (Max Segment Lifetime) time. After this timeout, the state progresses from the TIME_WAIT state to the CLOSED state, and the TCP connection closes. The procedure then moves to S1410 and ends.

The processing details in the case where, in phase 514 of TCP connection closing indicated in FIG. 10, the application device 101 performs communication operations in the manner of the client 501 side in FIG. 10, have been explained with reference to FIGS. 18 and 19. The FIN sending processing indicated by 509 is executed by the network communication unit 102 when the TCP connection is in the ESTABLISHED state. Then, the processing unit that executes the TCP protocol processing is switched, and the processing at the time of receiving the (FIN, ACK) indicated by 510 and the processing at the time of sending the ACK indicated by 511 are executed by the application system unit 103.

Next, the details of processing performed in the case where a request to close a TCP connection is made by the communication partner of the application device 101 shall be explained with reference to FIG. 20. The explanations provided assume that communication operations are performed on the server 502 side in the connection closing phase 514 in the communication flow example of FIG. 10. First, with the TCP connection in the ESTABLISHED state, a TCP connection closing request sent from the communication partner is received; then, an acknowledgment in response to the closing request is made, and a TCP packet indicating the closing request is sent from the application device 101 side.

Figure 20:
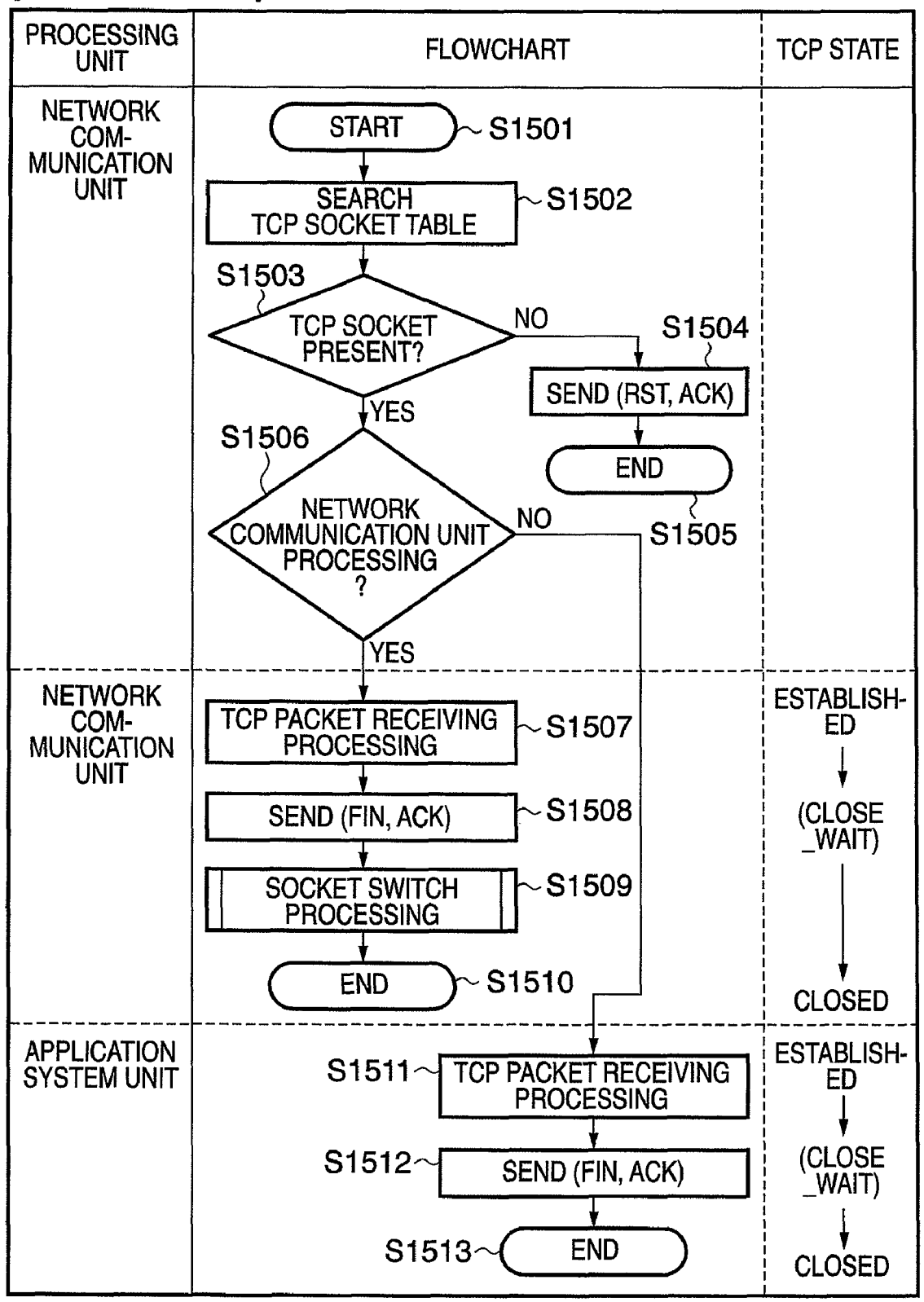
FIG. 20 is a diagram showing a FIN receiving process when a TCP socket is in an ESTABLISHED state.

The processing flow of FIG. 20 is started by a TCP connection closing request (FIN) being received from the communication partner while the TCP connection is in the ESTABLISHED state, in which the TCP connection is currently established. The processing flow starts with S1501. In S1502, the network communication unit 102 analyzes the header structure of the received TCP packet, acquires the socket pair information, and searches the TCP socket table. In S1503, the network communication unit 102 determines whether a TCP socket that should receive the packet is present. The processing performed in S1502 is the same as the processing performed in the aforementioned S702 in FIG. 12. In S1503, the procedure moves to S1504 when a TCP socket capable of receiving the received TCP packet is not present, and moves to S1506 when a TCP socket capable of receiving the received TCP packet is present. In S1504, the received packet cannot be accepted, and thus a (RST, ACK) packet, indicating a forced reset, is sent to the TCP socket that is the origin of the TCP packet. In the case where the (RST, ACK) packet is sent in S1504, the procedure moves to S1505 and ends.

When the procedure has moved from S1503 to S1506, a TCP socket capable of receiving the received TCP packet is present. In S1506, it is determined whether or not the processing unit that is to receive/process the received TCP packet is the network communication unit 102. In the case where the TCP socket layer process of the TCP communication has been switched by the socket switch process module 1310 in FIG. 8 so as to be processed within the network communication unit 102, the procedure moves to S1507. Otherwise, the processing is to be performed by the application system unit 103, and thus the procedure moves to S1511. S1507 to S1510 are processes performed by the network communication unit 102. On the other hand, S1511 to S1513 are processes performed by the application system unit 103.

In S1507, processing for receiving a TCP packet is performed, and the procedure then moves to S1508. The TCP packet is a connection closing request (FIN) from the communication partner, and therefore a TCP packet (FIN, ACK), in which an acknowledgment in response to the FIN and a connection closing request from the application device 101 side have been combined, is sent. The procedure then moves to S1509, where processing to switch the TCP socket is performed, so that the TCP socket processing is performed within the application system unit 103 thereafter. A notification is provided to the socket switch process module 1310 from the process module 1307 of FIG. 8, and the TCP socket processing moves from the network communication unit 102 to the application system unit 103. Accordingly, TCP protocol processing and socket layer processing in the TCP socket are executed by the process modules 1304 and 1305 of FIG. 8. After this, the procedure moves to S1510 and ends.

In the case where the procedure moves from S1506 to S1511, processing for receiving a TCP packet is performed in S1511, and the procedure then moves to S1512. In S1512, the TCP packet is a connection closing request (FIN) from the communication partner, and therefore a TCP packet (FIN, ACK), in which an acknowledgment in response to the FIN and a connection closing request from the application device 101 side have been combined, is sent. Then, the process flow moves to S1513 and ends.

The processing details in the case where, in phase 514 of TCP connection closing indicated in FIG. 10, the application device 101 performs communication operations in the manner of the server 502 side in FIG. 10, have been explained with reference to FIG. 20. The FIN sending processing indicated by 509 to the (FIN, ACK) sending indicated by 510 are executed by the network communication unit 102 when the TCP connection is in the ESTABLISHED state. The TCP connection is closed, and progresses to the CLOSED state. At the same time, socket processing is switched so as to be executed within the application system unit 103.

Next, explanations shall be given regarding a determination method in the present embodiment performed by the socket switch process module 1310 of FIG. 8 for switching the processing unit that performs the TCP communication processing.

A first condition for TCP communication to be switched from processing performed by the application system unit 103 to processing performed by the network communication unit 102 is that the TCP connection is in the ESTABLISHED state. The reason for this is that the application device requires high-speed data sending/receiving processing when sending/receiving application communication data, or in other words, when the TCP connection is currently established.

The second condition is that the number of TCP connections that can be processed by the network communication unit 102 is within an upper limit. As described earlier, because the state of the TCP connection progresses to ESTABLISHED, the processing steps such as S709 in FIG. 12 and S1008 in FIG. 15 perform processing for switching the processing unit that executes TCP protocol processing. If at this point in time the number of TCP connections that can be processed by the network communication unit 102 has not reached the upper limit, the TCP communication processing is switched so as to be executed within the network communication unit 102. However, if at this point in time the number of TCP connections that can be processed by the network communication unit 102 has reached the upper limit, the TCP communication processing is not switched so as to be executed by the network communication unit 102, and is performed by the application system unit 103 thereafter.

In the present embodiment, as mentioned earlier, the process modules 1305 and 1307 of FIG. 8 measure the number of sent/received packets per set amount of time, for TCP connections in the ESTABLISHED state performing TCP protocol processing. Moreover, the TCP socket layer process modules 1304 and 1306 of FIG. 8 measure the amount of data sent/received by the application per set amount of time. The socket switch process module 1310 of FIG. 8 creates/updates preferential rank information while acquiring notifications of the measurement results from 1304, 1305, 1306, and 1307. Here, for all instances of TCP communication in the ESTABLISHED state, the preferential rank information is created/updated so that TCP communication with a large number of sent/received packets or TCP communication with a large amount of sent/received data undergoes TCP protocol processing performed by the network communication unit 102.

When the number of instances of TCP communication processed by the network communication unit 102 has reached the upper limit number, and the state of the TCP communication undergoing TCP protocol processing performed by the network communication unit 102 progresses to the ESTABLISHED state, the TCP communication is switched. In other words, here, TCP communication is switched so as to be processed by the application system unit 103. Accordingly, TCP communication in the ESTABLISHED state being processed by the application system unit 103 is switched to be processed by the network communication unit 102. At the time of this interchange, the TCP socket is selected based on the preferential rank information described earlier, and the interchange is executed.

Note that when the number of instances of TCP communication processed by the network communication unit 102 has reached the upper limit number, a determination may be periodically made regarding the interchange of the TCP communication for which the network communication unit 102 and the application system unit 103 respectively perform TCP protocol processing. At this time, the interchange processing is based on the aforementioned preferential rank information.

In addition, a specific instance of application communication may be identified, and TCP protocol processing for that application communication may be preferentially performed by the network communication unit 102 when the application communication is in the ESTABLISHED state. This can be implemented by reserving, in advance, a specific TCP port number in the application device 101 and using that port number with the specific application. Furthermore, when a connection of a high-priority instance of TCP communication progresses to the ESTABLISHED state and a TCP protocol processing switch occurs, that connection is exchanged for a low-priority connection, even if the number of TCP connections that can be processed by the network communication unit 102 has reached the upper limit.

Figure 21:
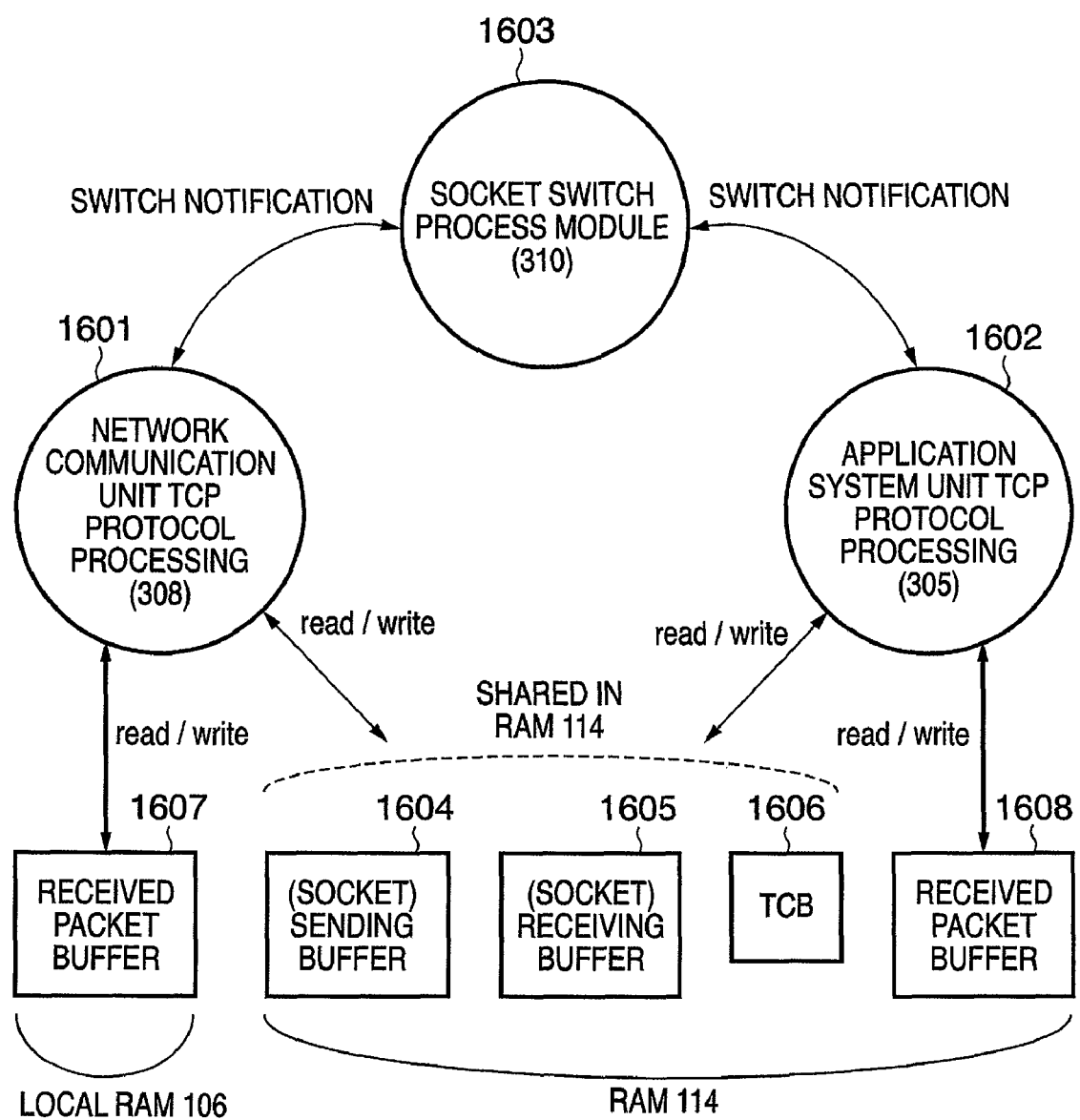
FIG. 21 is a diagram illustrating a socket switch processing.

Next, explanations shall be given regarding processing details of a switch of processing units that perform TCS communication processing, as executed by the socket switch process module 1310 of FIG. 8, with reference to FIG. 21.

In FIG. 21, 1601 indicates a TCP/IP process module of the application system unit 103, which is synonymous with the process module 1305 of FIG. 8. 1602 indicates a TCP process module of the network communication unit 102, and is synonymous with the process module 1307 of FIG. 8. 1603 indicates a socket switch process module, and is synonymous with the process module 1310 of FIG. 8. In TCP socket processing, a TCP protocol processing switch refers to changing which of 1601 and 1602 executes the processing.

In addition, 1604 and 1605 respectively indicate a sending buffer and a receiving buffer of the TCP socket for which TCP communication processing is switched (TCP sending/receiving buffer), and 1606 indicates a TCB linked to the TCP socket. As mentioned earlier in the processing steps of S602 and S603 in FIG. 11, S907 and S908 in FIG. 14, and the like, data of 1604, 1605, and 1606 is secured in the RAM 114 within the application system unit 103. In the present embodiment, these data buffers are still held in the RAM 114 even in the case where TCP protocol processing is switched between the process modules 1601 and 1602. To rephrase, copying or the like of data is not executed due to the switch; rather, reading/writing is performed for the same data in the RAM 114 after the switch. In other words, these pieces of data are shared by both process modules 1601 and 1602 in the RAM 114, and the module that processes the TCP socket accesses the data.

In the switch of TCP socket communication protocol processing, a switch notification is provided to the socket switch process module 1603 from one of 1601 and 1602. Details in the notification include the TCP socket number, the memory addresses of the sending buffer 1604 and the receiving buffer 1605, and the memory address of the TCB 1606. The socket switch process module 1603 communicates this information to the process module that is the destination of the switch.

Moreover, 1607 is a received packet buffer to which packets to be processed by 1601 are transferred, and 1608 is a received packet buffer to which packets to be processed by 1602 are transferred. 1607 is provided in the local RAM 106 within the network communication unit 102, and 1608 is provided in the RAM 114 within the application system unit 103. As described earlier, the TCP socket table is searched in response to a received packet; the TCP socket number of the TCP packet and which TCP protocol processing module the TCP packet is to be processed by are known thereby. Then, the packet data is transferred to one of the received packet buffer 1607 and the received packet buffer 1608.

Then, in the TCP socket switch processing, the socket switch process module 1603 also rewrites information of which process module the processing is performed by in the entry of the TCP socket in the TCP socket table.

Switching processing units between the network communication unit 102 and the application system unit 103 in accordance with the progression of the TCP connection state has thus far been explained with regard to TCP protocol processing and TCP socket layer processing in application communication that utilizes TCP communication.

In order to increase the speed of application communication, communication processing may be performed at high speed in the state in which a connection is currently established (ESTABLISHED) in TCP communication. Therefore, it is possible to increase the speed of application communication by executing the TCP protocol processing of this phase within the network communication unit 102. At the same time, the TCP communication processing load on the CPU 112 of the application system unit can be offloaded.

Note that the embodiments of the present invention may be implemented by, for example, a computer executing a program. Moreover, the embodiments of the present invention may also be implemented by a means for supplying the program to a computer, such as, for example, a recording medium readable by a computer, such as a CD-ROM on which the program has been recorded, or a transmission medium such as the Internet that transmits the program. Furthermore, the embodiments of the present invention may be implemented as the abovementioned program. The abovementioned program, recording medium, transmission medium, and program products are included within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese application No. 2006-213425 filed on Aug. 4, 2006, which is hereby incorporated by reference herein in its entirety.

What is claimed is:

1. A communication apparatus that performs application communication utilizing a TCP/IP protocol, the communication apparatus comprising:
   a network communication unit; and
   an application system unit,
   wherein the application system unit executes application communication utilizing one of a first TCP/IP protocol processing performed by the network communication unit and a second TCP/IP protocol processing performed by the application system unit, and
   the network communication unit switches the process with which the application communication is processed to one of the first TCP/IP protocol processing and the second TCP/IP protocol processing based on a transition in a state of a TCP connection of the application communication.

2. The apparatus according to claim 1,
   wherein the application system unit performs plural instances of application communication using a TCP/IP protocol;
   the application system unit executes each instance of application communication using one of the first TCP/IP protocol processing performed by the network communication unit and the second TCP/IP protocol processing performed by the application system unit; and
   the network communication unit switches the process with witch each instance of application communication is processed to one of the first TCP/IP protocol processing and the second TCP/IP protocol processing based on the number of TCP/IP connections in an ESTABLISHED state where the first TCP/IP protocol processing is executed.

3. The apparatus according to claim 1, wherein the first TCP/IP protocol processing is a processing in which processing performed by a hardware circuit included in the network communication unit or software processing performed by a processor included in the network communication unit is combined with computational processing performed by a hardware circuit.

4. The apparatus according to claim 1, wherein the second TCP/IP protocol processing is software processing executed by a processor within the application system unit.

5. The apparatus according to claim 1, wherein a TCP sending/receiving buffer is shared by the first TCP/IP protocol processing and the second TCP/IP protocol processing.

6. The apparatus according to claim 1, wherein TCP control information is shared by the first TCP/IP protocol processing and the second TCP/IP protocol processing.

7. The apparatus according to claim 1, wherein application communication is preferentially executed by the first TCP/IP protocol processing in the case of a specific application communication.

8. A communication control method for a communication apparatus that performs application communication utilizing a TCP/IP protocol, the communication apparatus comprising a network communication unit and an application unit, the method comprising steps of:
   executing application communication utilizing one of a first TCP/IP protocol processing performed by the network communication unit and a second TCP/IP protocol processing performed by the application system unit, and
   switching the process with which the application communication is processed to one of the first TCP/IP protocol processing and the second TCP/IP protocol processing based on a transition in a state of a TCP connection of the application communication.

9. The method according to claim 8,
   wherein plural instances of application communication using TCP/IP protocol are performed;
   each instance of application communication is executed using one of the first TCP/IP protocol processing performed by the network communication unit and the second TCP/IP protocol processing performed by the application system unit; and
   the process with which each instance of application communication is processed is switched to one of the first TCP/IP protocol processing and the second TCP/IP protocol processing based on the number of TCP connections in an ESTABLISHED state where the first TCP/IP protocol processing is executed.

10. The method according to claim 8, further comprising a step of sharing a TCP sending/receiving buffer between the first TCP/IP protocol processing and the second TCP/IP protocol processing.

11. The method according to claim 8, further comprising a step of sharing TCP control information between the first TCP/IP protocol processing and the second TCP/IP protocol processing.

12. The method according to claim 8, further comprising a step of preferentially executing application communication by the first TCP/IP protocol processing in the case of a specific application communication.

13. A non transitory computer readable storage medium on which is stored a computer program for controlling a communication apparatus that performs application communication utilizing a TCP/IP protocol, the communication apparatus comprising a network communication unit and an application system unit, the computer program comprising:
   a process of executing application communication utilizing one of a first TCP/IP protocol processing performed by the network communication unit and a second TCP/IP protocol processing performed by the application system unit, and
   a process of switching the process with which the application communication is processed to one of the first TCP/IP protocol processing and the second TCP/IP protocol processing based on a transition in a state of a TCP connection communication condition of the application communication.

14. The computer readable storage medium according to claim 13, wherein the computer program further comprises a process of sharing a TCP sending/receiving buffer between the first TCP/IP protocol processing and the second TCP/IP protocol processing.

15. The computer readable storage medium according to claim 13, wherein the computer program further comprises a process of sharing TCP control information between the first TCP/IP protocol processing and the second TCP/IP protocol processing.

16. The computer readable storage medium according to claim 13, wherein the computer program further comprises a process of preferentially executing application communication by the first TCP/IP protocol processing in the case of a specific application communication.

17. The apparatus according to claim 1, wherein the network communication unit switches the process so that the first TCP/IP protocol processing is executed if the TCP connection of the application communication is in an ESTABLISHED state, and the second TCP/IP protocol processing is executed if the TCP connection of the application communication is not in an ESTABLISHED state.

18. The apparatus according to claim 2, wherein the network communication unit determines a preferential rank of the plural instances of application communication based on a communication state of each instance of application communication, and switches the process so that the first TCP/IP protocol processing is preferentially executed from an application communication having a higher preferential rank.

19. The apparatus according to claim 17, wherein the network communication unit measures an amount of communication data or the number of communication packets of each instance of application communication, and determines a preferential rank of the plural instances of application communication based on the measured amount of communication data or number of communication packets.

* * * * *